United States Patent
Abdelghaffar et al.

(10) Patent No.: US 12,289,632 B2
(45) Date of Patent: Apr. 29, 2025

(54) RECIPROCITY-BASED BEAMFORMING FOR ARCHITECTURE-AWARE USER EQUIPMENT

(71) Applicant: QUALCOMM Incorporated, San Diego, CA (US)

(72) Inventors: Muhammad Sayed Khairy Abdelghaffar, San Jose, CA (US); Runxin Wang, San Diego, CA (US); Yu Zhang, Beijing (CN); Seyed Ali Akbar Fakoorian, San Diego, CA (US); Alexandros Manolakos, Escondido, CA (US); Krishna Kiran Mukkavilli, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 358 days.

(21) Appl. No.: 17/905,727

(22) PCT Filed: Apr. 26, 2020

(86) PCT No.: PCT/CN2020/086919
§ 371 (c)(1),
(2) Date: Sep. 6, 2022

(87) PCT Pub. No.: WO2021/217288
PCT Pub. Date: Nov. 4, 2021

(65) Prior Publication Data
US 2023/0353297 A1    Nov. 2, 2023

(51) Int. Cl.
*H04W 8/24* (2009.01)
*H04B 7/0404* (2017.01)
(Continued)

(52) U.S. Cl.
CPC ...... *H04W 28/0215* (2013.01); *H04B 7/0404* (2013.01); *H04B 7/0456* (2013.01);
(Continued)

(58) Field of Classification Search
CPC ....... H04B 7/0456–0487; H04L 5/1438–1453; H04W 8/22–245;
(Continued)

(56) References Cited

U.S. PATENT DOCUMENTS 9,806,932 B2 * 10/2017 Zhang .................. H04L 27/362
10,326,509 B2 *  6/2019 Challa ..................... H04W 8/24
(Continued)

FOREIGN PATENT DOCUMENTS

| EP | 3562052 A1 | 10/2019 |
|---|---|---|
| WO | WO-2016039604 A1 | 3/2016 |
| WO | WO-2020019136 A1 | 1/2020 |

OTHER PUBLICATIONS

Supplementary European Search Report—EP20933089—Search Authority—Munich—Dec. 19, 2023.
(Continued)

*Primary Examiner* — Brendan Y Higa
(74) *Attorney, Agent, or Firm* — Holland & Hart LLP

(57) ABSTRACT

Methods, systems, and devices for wireless communications are described. In some systems, a user equipment (UE) may transmit, to a base station, a UE capability message indicating support for at least a first demodulation mode or a second demodulation mode. The first demodulation mode may correspond to a single demodulation procedure associated with a set of antenna ports at the UE, and the second demodulation mode may correspond to multiple demodulation procedures, each procedure associated with a respective subset of antenna ports at the UE. In some cases, the UE may flexibly switch between demodulation modes. The UE may
(Continued)

receive, from the base station, one or more downlink signals via one or more downlink beams based on the indication of the first demodulation mode or the second demodulation mode. The UE may demodulate the one or more downlink signals based on the indicated (e.g., an active) demodulation mode.

30 Claims, 20 Drawing Sheets

(51) Int. Cl.
*H04B 7/0456* (2017.01)
*H04L 5/14* (2006.01)
*H04W 28/02* (2009.01)
*H04W 72/51* (2023.01)
*H04L 5/00* (2006.01)
*H04L 27/26* (2006.01)

(52) U.S. Cl.
CPC ............. *H04L 5/1453* (2013.01); *H04W 8/24* (2013.01); *H04W 72/51* (2023.01); *H04L 5/0041* (2013.01); *H04L 27/2649* (2013.01)

(58) Field of Classification Search
CPC ......... H04W 28/0215; H04W 28/0231; H04W 72/50–512; H04W 72/54–541
See application file for complete search history.

(56) References Cited

U.S. PATENT DOCUMENTS

| | | | |
|---|---|---|---|
| 10,419,244 B2* | 9/2019 | Jiang | H04L 5/00 |
| 11,368,916 B2* | 6/2022 | Park | H04B 7/0456 |
| 11,418,992 B2* | 8/2022 | Nammi | H04B 17/318 |
| 11,483,180 B2* | 10/2022 | Li | H04W 8/24 |
| 2014/0177683 A1 | 6/2014 | Krishnamurthy et al. | |
| 2016/0065351 A1* | 3/2016 | Zhang | H04L 27/183 370/329 |
| 2016/0269218 A1* | 9/2016 | Zhang | H04L 1/0016 |
| 2017/0094545 A1* | 3/2017 | Subrahmanya | H04L 5/0048 |
| 2018/0006706 A1 | 1/2018 | Cheng et al. | |
| 2018/0123657 A1 | 5/2018 | Kundargi et al. | |
| 2019/0223033 A1 | 7/2019 | Nam et al. | |
| 2019/0319737 A1* | 10/2019 | Hosseini | H04L 27/2626 |
| 2020/0112349 A1 | 4/2020 | Yang et al. | |
| 2020/0163156 A1* | 5/2020 | Ye | H04W 88/06 |
| 2020/0266867 A1* | 8/2020 | Park | H04B 7/0478 |
| 2020/0336998 A1* | 10/2020 | Rahman | H04B 7/0639 |
| 2020/0389786 A1* | 12/2020 | Yerramalli | H04L 5/0007 |
| 2021/0351827 A1* | 11/2021 | Hao | H04L 5/0048 |
| 2022/0416993 A1* | 12/2022 | Berger | H04L 5/0023 |

OTHER PUBLICATIONS

Intel Corporation: "Remaining Issues on Codebook Based UL Transmission", 3GPP Draft, 3GPP TSG RAN WG1 Meeting NR#3, R1-1716285, Nagoya, Japan, Sep. 18-27, 2017, pp. 1-6.
International Search Report and Written Opinion—PCT/CN2020/086919—ISA/EPO—Jan. 27, 2021.

* cited by examiner

RECIPROCITY-BASED BEAMFORMING FOR ARCHITECTURE-AWARE USER EQUIPMENT

CROSS REFERENCE

The present application is a 371 national stage filing of International PCT Application No. PCT/CN2020/086919 by ABDELGHAFFAR et al. entitled "RECIPROCITY-BASED BEAMFORMING FOR ARCHITECTURE-AWARE USER EQUIPMENT," filed Apr. 26, 2020, which is assigned to the assignee hereof, and which is expressly incorporated by reference in its entirety herein.

FIELD OF TECHNOLOGY

The following relates generally to wireless communications and more specifically to reciprocity-based beamforming for architecture-aware user equipment (UEs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UEs).

In some wireless communications systems, a UE and a base station may experience a mismatch between a precoding scheme performed at the base station for downlink signals and a downlink signal demodulation architecture at the UE. For example, a UE may be configured to operate in one or more demodulation modes, but the base station may be unable to accurately determine which demodulation modes are supported or currently being used by specific UEs in the system. This may lead to a mismatch between a precoding scheme performed at the base station and a demodulation mode or architecture at a UE. Furthermore, a UE may be configured to transmit sounding reference signals (SRSs) to the base station for a set of antenna ports of the UE in a "full sounding" configuration. However, in some cases, the full sounding configuration may further result in a mismatch between the precoding scheme used by the base station and the demodulation mode implemented at the UE. Such mismatches may result in relatively poor performance for wireless communications between the UE and the base station.

SUMMARY

The described techniques relate to improved methods, systems, devices, and apparatuses that support reciprocity-based beamforming for architecture-aware user equipment (UEs). Generally, the described techniques provide for signaling configured to support a correlation between a precoding scheme used by a base station (e.g., a NodeB or giga-NodeB (either of which may be referred to as a gNB)) and a downlink signal demodulation mode used by a UE. For example, a UE may transmit a UE capability message including an indication of at least one of a first demodulation mode or a second demodulation mode supported by the UE. In some aspects, the first demodulation mode corresponds to a demodulation procedure associated with a set of antenna ports at the UE (e.g., a single demodulation procedure for a full set of antenna ports at the UE). Comparatively, the second demodulation mode may correspond to multiple demodulation procedures associated with respective subsets of the set of antenna ports at the UE. The UE capability message may indicate a specific demodulation mode implemented at the UE or may indicate a capability of the UE to flexibly switch between demodulation modes. The base station may receive the UE capability message and may precode and transmit one or more downlink signals based on the indication of the first demodulation mode or the second demodulation mode. The UE may receive and demodulate the one or more downlink signals according to the first demodulation mode or the second demodulation mode. Accordingly, aspects of the present disclosure may enable coordination of a precoding scheme used by the base station and a demodulation mode of the UE in order to facilitate more efficient and reliable wireless communications.

A method for wireless communications at a UE is described. The method may include transmitting, to a base station, a UE capability message including an indication of at least one of a first demodulation mode supported by the UE or a second demodulation mode supported by the UE, the first demodulation mode corresponding to a demodulation procedure associated with a set of antenna ports at the UE and the second demodulation mode corresponding to a set of demodulation procedures, each of the set of demodulation procedures associated with a respective subset of the set of antenna ports at the UE, receiving, from the base station, one or more downlink signals via one or more downlink beams, the one or more downlink beams based on the indication of at least one of the first demodulation mode or the second demodulation mode, and demodulating the one or more downlink signals according to the first demodulation mode or the second demodulation mode based on the indication.

An apparatus for wireless communications at a UE is described. The apparatus may include a processor, memory coupled with the processor, and instructions stored in the memory. The instructions may be executable by the processor to cause the apparatus to transmit, to a base station, a UE capability message including an indication of at least one of a first demodulation mode supported by the UE or a second demodulation mode supported by the UE, the first demodulation mode corresponding to a demodulation procedure associated with a set of antenna ports at the UE and the second demodulation mode corresponding to a set of demodulation procedures, each of the set of demodulation procedures associated with a respective subset of the set of antenna ports at the UE, receive, from the base station, one or more downlink signals via one or more downlink beams, the one or more downlink beams based on the indication of at least one of the first demodulation mode or the second demodulation mode, and demodulate the one or more downlink signals according to the first demodulation mode or the second demodulation mode based on the indication.

Another apparatus for wireless communications at a UE is described. The apparatus may include means for transmitting, to a base station, a UE capability message including an indication of at least one of a first demodulation mode supported by the UE or a second demodulation mode supported by the UE, the first demodulation mode corresponding to a demodulation procedure associated with a set of antenna ports at the UE and the second demodulation mode corresponding to a set of demodulation procedures, each of the set of demodulation procedures associated with a respective subset of the set of antenna ports at the UE, receiving, from the base station, one or more downlink signals via one or more downlink beams, the one or more downlink beams based on the indication of at least one of the first demodulation mode or the second demodulation mode, and demodulating the one or more downlink signals according to the first demodulation mode or the second demodulation mode based on the indication.

A non-transitory computer-readable medium storing code for wireless communications at a UE is described. The code may include instructions executable by a processor to transmit, to a base station, a UE capability message including an indication of at least one of a first demodulation mode supported by the UE or a second demodulation mode supported by the UE, the first demodulation mode corresponding to a demodulation procedure associated with a set of antenna ports at the UE and the second demodulation mode corresponding to a set of demodulation procedures, each of the set of demodulation procedures associated with a respective subset of the set of antenna ports at the UE, receive, from the base station, one or more downlink signals via one or more downlink beams, the one or more downlink beams based on the indication of at least one of the first demodulation mode or the second demodulation mode, and demodulate the one or more downlink signals according to the first demodulation mode or the second demodulation mode based on the indication.

Some examples of the method, apparatuses, and non-transitory computer-readable medium described herein may further include operations, features, means, or instructions for transmitting, to the base station, a set of sounding reference signals (SRSs) based on the indication of at least one of the first demodulation mode or the second demodulation mode, where each SRS corresponds to a respective antenna port of the set of antenna ports.

In some examples of the method, apparatuses, and non-transitory computer-readable medium described herein, the indication of at least one of the first demodulation mode or the second demodulation mode indicates the second demodulation mode and transmitting the set of SRSs may include operations, features, means, or instructions for transmitting a first subset of SRSs of the set of SRSs to the base station via a first subset of antenna ports of the set of antenna ports based on the second demodulation mode and transmitting a second subset of SRSs of the set of SRSs different from the first subset of SRSs to the base station via a second subset of antenna ports of the set of antenna ports different from the first subset of antenna ports based on the second demodulation mode.

Some examples of the method, apparatuses, and non-transitory computer-readable medium described herein may further include operations, features, means, or instructions for receiving a configuration message including an indication of an SRS resource set configuration for transmitting the set of SRSs.

In some examples of the method, apparatuses, and non-transitory computer-readable medium described herein, the SRS resource set configuration includes an SRS resource set, and the first subset of SRSs and the second subset of SRSs may be transmitted in the SRS resource set based on the configuration message.

In some examples of the method, apparatuses, and non-transitory computer-readable medium described herein, transmitting the first subset of SRSs and the second subset of SRSs may include operations, features, means, or instructions for at least one of transmitting the first subset of SRSs via a first set of consecutive SRS resources of the SRS resource set and transmitting the second subset of SRSs via a second set of consecutive SRS resources of the SRS resource set, or transmitting the first subset of SRSs and the second subset of SRSs via interleaved SRS resources of the SRS resource set.

In some examples of the method, apparatuses, and non-transitory computer-readable medium described herein, the SRS resource set configuration includes a first SRS resource set and a second SRS resource set, the first subset of SRSs may be transmitted in the first SRS resource set, and the second subset of SRSs may be transmitted in the second SRS resource set.

In some examples of the method, apparatuses, and non-transitory computer-readable medium described herein, first subset of antenna ports corresponds to a first panel associated with the first SRS resource set and the second subset of antenna ports corresponds to a second panel different from the first panel and associated with the second SRS resource set.

In some examples of the method, apparatuses, and non-transitory computer-readable medium described herein, the indication of at least one of the first demodulation mode or the second demodulation mode indicates a flexible switching mode between the first demodulation mode and the second demodulation mode.

Some examples of the method, apparatuses, and non-transitory computer-readable medium described herein may further include operations, features, means, or instructions for transmitting, to the base station, a request message including at least one of a request to transition from the first demodulation mode to the second demodulation mode or a request to transition from the second demodulation mode to the first demodulation mode, where transmitting the request message may be based on the flexible switching mode between the first demodulation mode and the second demodulation mode.

Some examples of the method, apparatuses, and non-transitory computer-readable medium described herein may further include operations, features, means, or instructions for receiving, from the base station and in response to the request message, a feedback message including at least one of an acknowledgement for the UE to transition from the first demodulation mode to the second demodulation mode or an acknowledgement for the UE to transition from the second demodulation mode to the first demodulation mode.

Some examples of the method, apparatuses, and non-transitory computer-readable medium described herein may further include operations, features, means, or instructions for receiving, from the base station, a configuration message including at least one of an indication for the UE to transition from the first demodulation mode to the second demodulation mode or an indication for the UE to transition from the second demodulation mode to the first demodulation mode.

In some examples of the method, apparatuses, and non-transitory computer-readable medium described herein, the indication of at least one of the first demodulation mode or the second demodulation mode indicates the first demodulation mode and receiving the one or more downlink signals may include operations, features, means, or instructions for receiving, at the set of antenna ports, a single downlink signal via a single downlink beam based on the first demodulation mode.

In some examples of the method, apparatuses, and non-transitory computer-readable medium described herein, demodulating the one or more downlink signals may include operations, features, means, or instructions for performing the demodulation procedure associated with the set of antenna ports on the single downlink signal received at the set of antenna ports.

In some examples of the method, apparatuses, and non-transitory computer-readable medium described herein, the single downlink signal may be associated with a single precoder at the base station.

In some examples of the method, apparatuses, and non-transitory computer-readable medium described herein, the indication of at least one of the first demodulation mode or the second demodulation mode indicates the second demodulation mode and receiving the one or more downlink signals may include operations, features, means, or instructions for receiving, at a first subset of antenna ports of the set of antenna ports, a first downlink signal via a first downlink beam and receiving, at a second subset of antenna ports of the set of antenna ports different from the first subset of antenna ports, a second downlink signal via a second downlink beam, where the first downlink signal and the second downlink signal may be received based on the second demodulation mode.

In some examples of the method, apparatuses, and non-transitory computer-readable medium described herein, demodulating the one or more downlink signals may include operations, features, means, or instructions for performing a first demodulation procedure of the set of demodulation procedures on the first downlink signal received at the first subset of antenna ports and performing a second demodulation procedure of the set of demodulation procedures on the second downlink signal received at the second subset of antenna ports.

In some examples of the method, apparatuses, and non-transitory computer-readable medium described herein, demodulating the one or more downlink signals further may include operations, features, means, or instructions for combining a first output of the first demodulation procedure and a second output of the second demodulation procedure.

In some examples of the method, apparatuses, and non-transitory computer-readable medium described herein, combining the first output of the first demodulation procedure and the second output of the second demodulation procedure may include operations, features, means, or instructions for combining a first log-likelihood ratio (LLR) value output from the first demodulation procedure and a second LLR value output from the second demodulation procedure.

In some examples of the method, apparatuses, and non-transitory computer-readable medium described herein, the first downlink signal may be associated with a first precoder at the base station and the second downlink signal may be associated with a second precoder at the base station different from the first precoder.

In some examples of the method, apparatuses, and non-transitory computer-readable medium described herein, the indication of at least one of the first demodulation mode or the second demodulation mode includes a bit field in the UE capability message indicating at least one of the first demodulation mode, the second demodulation mode, or a flexible switching mode between the first demodulation mode and the second demodulation mode.

In some examples of the method, apparatuses, and non-transitory computer-readable medium described herein, the UE capability message includes an indication of a preferred precoder type, the indication of the preferred precoder type including the indication of at least one of the first demodulation mode or the second demodulation mode.

In some examples of the method, apparatuses, and non-transitory computer-readable medium described herein, the first demodulation mode may be configured to demodulate eight or fewer downlink layers and the second demodulation mode may be configured to demodulate four or fewer downlink layers.

A method for wireless communications at a base station is described. The method may include receiving, from a UE, a UE capability message including an indication of at least one of a first demodulation mode supported by the UE or a second demodulation mode supported by the UE, the first demodulation mode corresponding to a demodulation procedure associated with a set of antenna ports at the UE and the second demodulation mode corresponding to a set of demodulation procedures, each of the set of demodulation procedures associated with a respective subset of the set of antenna ports at the UE, precoding one or more downlink signals based on the indication of at least one of the first demodulation mode or the second demodulation mode, and transmitting the one or more downlink signals to the UE based on the indication of at least one of the first demodulation mode or the second demodulation mode.

An apparatus for wireless communications at a base station is described. The apparatus may include a processor, memory coupled with the processor, and instructions stored in the memory. The instructions may be executable by the processor to cause the apparatus to receive, from a UE, a UE capability message including an indication of at least one of a first demodulation mode supported by the UE or a second demodulation mode supported by the UE, the first demodulation mode corresponding to a demodulation procedure associated with a set of antenna ports at the UE and the second demodulation mode corresponding to a set of demodulation procedures, each of the set of demodulation procedures associated with a respective subset of the set of antenna ports at the UE, precode one or more downlink signals based on the indication of at least one of the first demodulation mode or the second demodulation mode, and transmit the one or more downlink signals to the UE based on the indication of at least one of the first demodulation mode or the second demodulation mode.

Another apparatus for wireless communications at a base station is described. The apparatus may include means for receiving, from a UE, a UE capability message including an indication of at least one of a first demodulation mode supported by the UE or a second demodulation mode supported by the UE, the first demodulation mode corresponding to a demodulation procedure associated with a set of antenna ports at the UE and the second demodulation mode corresponding to a set of demodulation procedures, each of the set of demodulation procedures associated with a respective subset of the set of antenna ports at the UE, precoding one or more downlink signals based on the indication of at least one of the first demodulation mode or the second demodulation mode, and transmitting the one or more downlink signals to the UE based on the indication of at least one of the first demodulation mode or the second demodulation mode.

A non-transitory computer-readable medium storing code for wireless communications at a base station is described. The code may include instructions executable by a processor to receive, from a UE, a UE capability message including an indication of at least one of a first demodulation mode supported by the UE or a second demodulation mode supported by the UE, the first demodulation mode corresponding to a demodulation procedure associated with a set of antenna ports at the UE and the second demodulation mode corresponding to a set of demodulation procedures, each of the set of demodulation procedures associated with a respective subset of the set of antenna ports at the UE, precode one or more downlink signals based on the indication of at least one of the first demodulation mode or the second demodulation mode, and transmit the one or more downlink signals to the UE based on the indication of at least one of the first demodulation mode or the second demodulation mode.

Some examples of the method, apparatuses, and non-transitory computer-readable medium described herein may further include operations, features, means, or instructions for receiving, from the UE, a set of SRSs based on the indication of at least one of the first demodulation mode or the second demodulation mode, where each SRS corresponds to a respective antenna port of the set of antenna ports at the UE.

In some examples of the method, apparatuses, and non-transitory computer-readable medium described herein, the indication of at least one of the first demodulation mode or the second demodulation mode indicates the second demodulation mode and receiving the set of SRSs may include operations, features, means, or instructions for receiving a first subset of SRSs of the set of SRSs from a first subset of antenna ports of the set of antenna ports based on the second demodulation mode and receiving a second subset of SRSs of the set of SRSs different from the first subset of SRSs from a second subset of antenna ports of the set of antenna ports different from the first subset of antenna ports based on the second demodulation mode.

Some examples of the method, apparatuses, and non-transitory computer-readable medium described herein may further include operations, features, means, or instructions for transmitting a configuration message including an indication of a SRS resource set configuration for the UE to transmit the set of SRSs.

In some examples of the method, apparatuses, and non-transitory computer-readable medium described herein, the SRS resource set configuration includes an SRS resource set, and the first subset of SRSs and the second subset of SRSs may be received in the SRS resource set based on the configuration message.

In some examples of the method, apparatuses, and non-transitory computer-readable medium described herein, receiving the first subset of SRSs and the second subset of SRSs may include operations, features, means, or instructions for at least one of receiving the first subset of SRSs via a first set of consecutive SRS resources of the SRS resource set and receiving the second subset of SRSs via a second set of consecutive SRS resources of the SRS resource set, or receiving the first subset of SRSs and the second subset of SRSs via interleaved SRS resources of the SRS resource set.

In some examples of the method, apparatuses, and non-transitory computer-readable medium described herein, the SRS resource set configuration includes a first SRS resource set and a second SRS resource set, the first subset of SRSs may be received in the first SRS resource set, and the second subset of SRSs may be received in the second SRS resource set.

In some examples of the method, apparatuses, and non-transitory computer-readable medium described herein, the first subset of antenna ports corresponds to a first panel associated with the first SRS resource set and the second subset of antenna ports corresponds to a second panel different from the first panel and associated with the second SRS resource set.

In some examples of the method, apparatuses, and non-transitory computer-readable medium described herein, the indication of at least one of the first demodulation mode or the second demodulation mode indicates a flexible switching mode between the first demodulation mode and the second demodulation mode.

Some examples of the method, apparatuses, and non-transitory computer-readable medium described herein may further include operations, features, means, or instructions for receiving, from the UE, a request message including at least one of a request to transition from the first demodulation mode to the second demodulation mode or a request to transition from the second demodulation mode to the first demodulation mode, where receiving the request message may be based on the flexible switching mode between the first demodulation mode and the second demodulation mode.

Some examples of the method, apparatuses, and non-transitory computer-readable medium described herein may further include operations, features, means, or instructions for transmitting, to the UE and in response to the request message, a feedback message including at least one of an acknowledgement for the UE to transition from the first demodulation mode to the second demodulation mode or an acknowledgement for the UE to transition from the second demodulation mode to the first demodulation mode.

Some examples of the method, apparatuses, and non-transitory computer-readable medium described herein may further include operations, features, means, or instructions for transmitting, to the UE, a configuration message including at least one of an indication for the UE to transition from the first demodulation mode to the second demodulation mode or an indication for the UE to transition from the second demodulation mode to the first demodulation mode.

In some examples of the method, apparatuses, and non-transitory computer-readable medium described herein, the indication of at least one of the first demodulation mode or the second demodulation mode indicates the first demodulation mode and transmitting the one or more downlink signals may include operations, features, means, or instructions for transmitting, to the set of antenna ports, a single downlink signal via a single downlink beam based on the first demodulation mode.

In some examples of the method, apparatuses, and non-transitory computer-readable medium described herein, precoding the one or more downlink signals may include operations, features, means, or instructions for precoding the single downlink signal with a single precoder corresponding to the single downlink beam.

In some examples of the method, apparatuses, and non-transitory computer-readable medium described herein, the indication of at least one of the first demodulation mode or the second demodulation mode indicates the second demodulation mode and transmitting the one or more downlink signals may include operations, features, means, or instructions for transmitting, to a first subset of antenna ports of the set of antenna ports, a first downlink signal via a first downlink beam and transmitting, to a second subset of antenna ports of the set of antenna ports different from the first subset of antenna ports, a second downlink signal via a second downlink beam different from the first downlink beam, where the first downlink signal and the second downlink signal may be transmitted based on the second demodulation mode.

In some examples of the method, apparatuses, and non-transitory computer-readable medium described herein, precoding the one or more downlink signals may include operations, features, means, or instructions for precoding the first downlink signal with a first precoder corresponding to the first downlink beam and precoding the second downlink signal with a second precoder different from the first precoder and corresponding to the second downlink beam.

In some examples of the method, apparatuses, and non-transitory computer-readable medium described herein, the indication of at least one of the first demodulation mode or the second demodulation mode includes a bit field in the UE capability message indicating at least one of the first demodulation mode, the second demodulation mode, or a flexible switching mode between the first demodulation mode and the second demodulation mode.

In some examples of the method, apparatuses, and non-transitory computer-readable medium described herein, the UE capability message includes an indication of a preferred precoder type, the indication of the preferred precoder type including the indication of at least one of the first demodulation mode or the second demodulation mode.

In some examples of the method, apparatuses, and non-transitory computer-readable medium described herein, the first demodulation mode may be configured for the UE to demodulate eight or fewer downlink layers and the second demodulation mode may be configured for the UE to demodulate four or fewer downlink layers.

DETAILED DESCRIPTION

Figure 1:
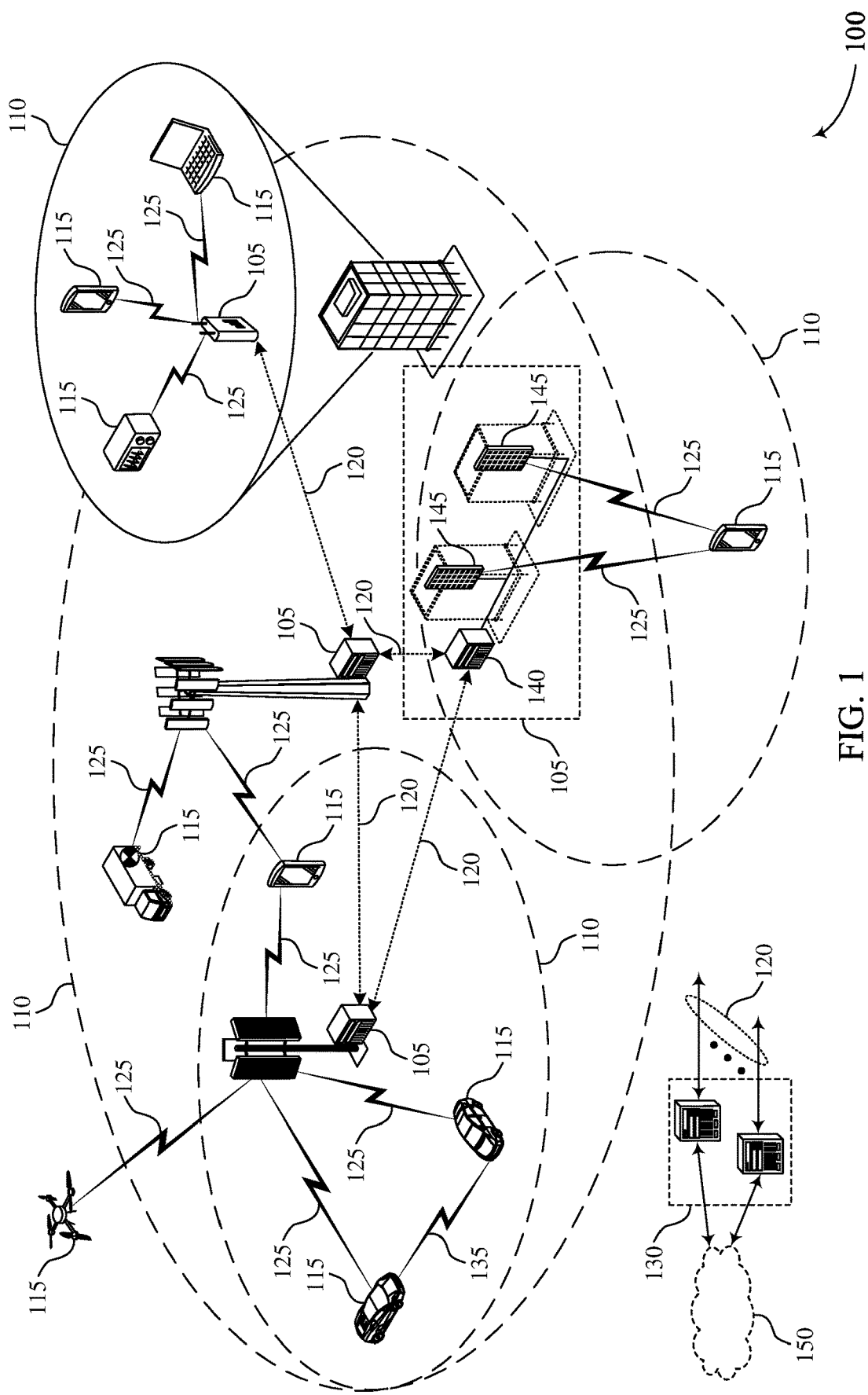
FIGS. 1 and 2 illustrate examples of wireless communications systems that support reciprocity-based beamforming for architecture-aware user equipment (UEs) in accordance with aspects of the present disclosure.

In some wireless communications systems, a user equipment (UE) and a base station may experience a mismatch between a precoding scheme performed at the base station for downlink signals and a downlink signal demodulation architecture at the UE. For example, a UE may be configured to operate using one or more demodulation architectures, in one or more demodulation modes, or according to some combination thereof. However, if different UEs may implement different demodulation modes or if a UE may switch between demodulation modes, the base station may be unable to accurately determine which demodulation mode is supported or currently being used by which UE. This may lead to a mismatch between a precoding scheme performed at the base station and a demodulation mode implemented at a UE. Furthermore, a UE may transmit sounding reference signals (SRSs) to the base station for a set of antenna ports of the UE in a "full sounding" configuration. However, in some cases, the full sounding configuration may further result in a mismatch between the precoding scheme used by the base station and the demodulation architecture or mode used by the UE.

Aspects of the present disclosure may be directed to wireless communication techniques which support reciprocity-based beamforming for architecture-aware UEs. More specifically, aspects of the present disclosure may be directed to wireless communication techniques which enable coordination of precoding schemes for downlink signals used at a base station with corresponding demodulation architectures or modes used at a UE. For example, in some aspects, a UE may transmit a UE capability message to a base station. The UE capability message may include an indication of a first demodulation mode or a second demodulation mode supported by the UE. The UE may also transmit SRSs to the base station based on whether the UE is operating in the first demodulation mode or the second demodulation mode. The base station may precode one or more downlink signals based on the received SRSs, the indication of the first or second demodulation mode in the UE capability message, or both. For example, in cases where the UE indicates the first demodulation mode, the base station may precode a downlink signal with a precoder for a full set of antenna ports at the UE. In such an example, the UE may receive the downlink signal at the set of antenna ports and perform a demodulation procedure on the downlink signal. By way of another example, in cases where the UE indicates the second demodulation mode, the base station may precode a first downlink signal with a first precoder and a second downlink signal with a second precoder. In such an example, the UE may receive the first downlink signal at a first subset of antenna ports and receive the second downlink signal at a second subset of antenna ports. The UE may perform separate demodulation procedures on the first downlink signal and the second downlink signal and may combine the outputs.

In some aspects, the UE may support flexible switching between demodulation modes. In some such aspects, the UE may transmit a UE capability message to the base station indicating that switching between demodulation modes is supported by the UE. To switch between demodulation modes, the UE may transmit a message requesting to transition from the first demodulation mode to the second demodulation mode, or vice versa. Conversely, the base station may transmit a configuration message to the UE indicating that the UE is to transition from the first demodulation mode to the second demodulation mode, or vice versa. In some aspects, such techniques may enable the base station and the UE to synchronize the precoding schemes and demodulation modes (e.g., demodulation architectures) used by the respective devices in order to improve efficiency and reliability of wireless communications.

Aspects of the subject matter described in this disclosure may be implemented to realize one or more of the following potential improvements, among others. The techniques employed by UEs may provide benefits and enhancements to the operation of the UEs. For example, operations performed by the UEs may provide improvements to wireless communications. In some examples, configuring the UEs to support signaling for indicating a given demodulation mode may support improvements to message reliability, power consumption, spectral efficiency, and, in some examples, may promote enhanced efficiency for wireless communications operations, among other benefits.

Aspects of the disclosure are initially described in the context of wireless communications systems. Aspects of the disclosure are additionally described in the context of schematic diagrams, SRS resource set block diagrams, and process flows. Aspects of the disclosure are further illustrated by and described with reference to apparatus diagrams, system diagrams, and flowcharts that relate to reciprocity-based beamforming for architecture-aware UEs.

FIG. 1 illustrates an example of a wireless communications system 100 that supports reciprocity-based beamforming for architecture-aware UEs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may support reciprocity-based beamforming for architecture-aware UEs 115. More specifically, the wireless communications system 100 may support wireless communications techniques which enable coordination of precoding schemes for downlink signals used at a base station 105 with corresponding demodulation architectures or modes used at a UE 115. For example, in some aspects, the UE 115 may transmit a UE capability message to the base station 105. The UE capability message may include an indication of a first demodulation mode or a second demodulation mode supported by the UE 115 (e.g., a fixed scheme for the first demodulation mode, a fixed scheme for the second demodulation mode, or a flexible scheme supporting both the first demodulation mode and the second demodulation mode). The UE 115 may also transmit SRSs to the base station 105 based on whether the UE 115 is operating in the first demodulation mode or the second demodulation mode. The base station 105 may precode one or more downlink signals based on received SRSs, the indication of the first or second demodulation mode, or both.

For example, if the UE 115 indicates the first demodulation mode, the base station 105 may precode a downlink signal with a precoder (e.g., a single precoder). In such an example, the UE 115 may receive the downlink signal at a set of antenna ports and perform a demodulation procedure on the downlink signal. By way of another example, if the UE 115 indicates the second demodulation mode, the base station 105 may be configured to precode a first downlink signal with a first precoder and a second downlink signal with a second precoder. In such an example, the UE 115 may receive the first downlink signal at a first subset of antenna ports and receive the second downlink signal at a second subset of antenna ports. The UE 115 may perform separate demodulation procedures on the first downlink signal and the second downlink signal and combine the results of the demodulation procedures. Accordingly, the base station 105 and UE 115 may operate using corresponding precoding (e.g., beamforming) and demodulation procedures, supporting reliable reception of downlink signals at the UE 115.

Figure 2:
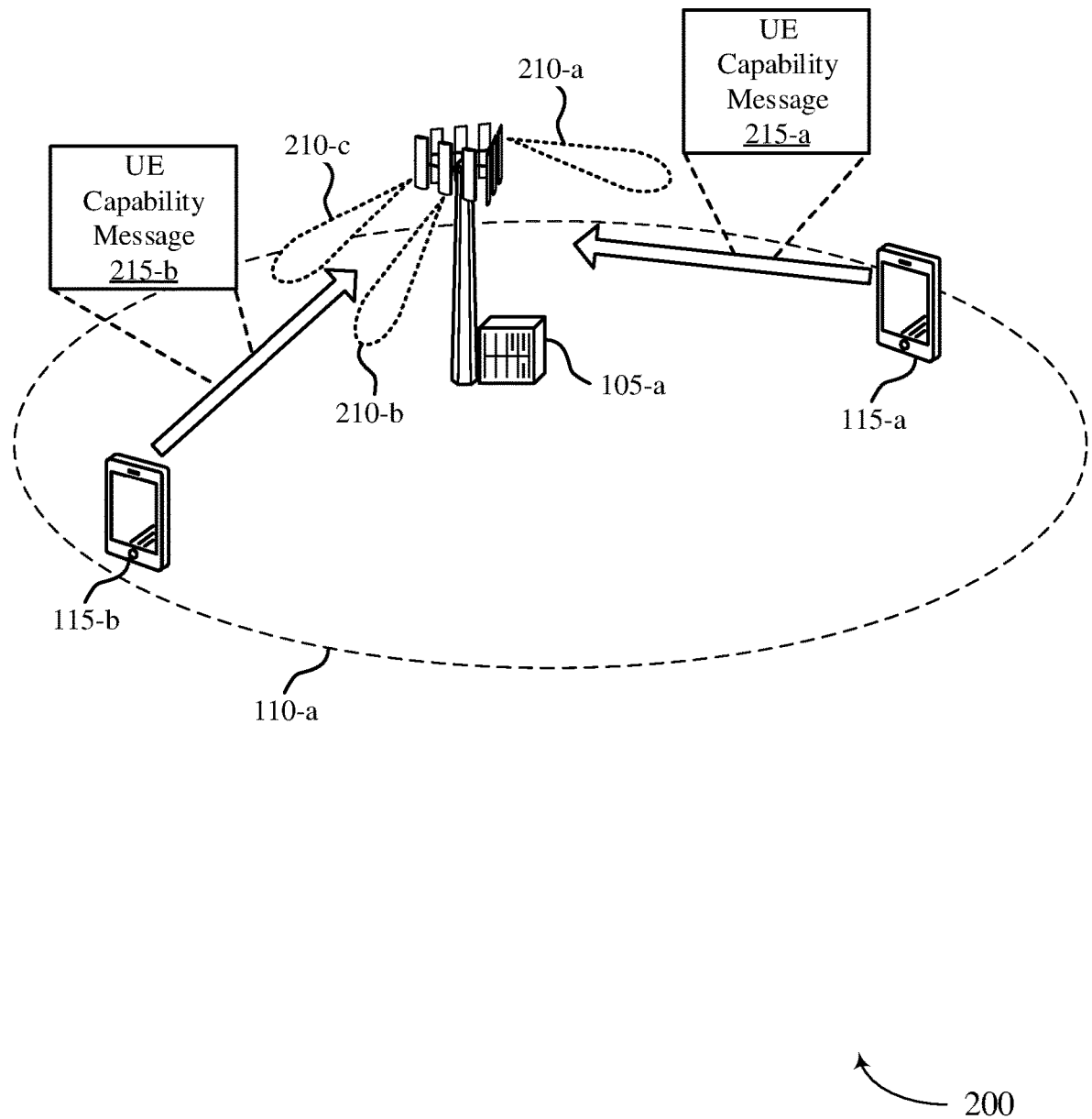

FIG. 2 illustrates an example of a wireless communications system 200 that supports reciprocity-based beamforming for architecture-aware UEs in accordance with aspects of the present disclosure. In some examples, the wireless communications system 200 may implement aspects of a wireless communications system 100. For example, the wireless communications system 200 may include a base station 105-*a* and UEs 115-*a* and 115-*b*, which may be examples of a base station 105 and UEs 115 as described with reference to FIG. 1. The base station 105-*a* may serve geographic coverage area 110-*a*. The wireless communications system 200 may support coordination of a precoding scheme implemented at the base station 105-*a* with a demodulation mode implemented at each UE 115, for example, using UE capability signaling.

A base station 105 may be configured to precode and transmit downlink signals to UEs 115 via downlink beams determined according to precoding schemes. In some wireless communications systems (e.g., other systems), the downlink signals transmitted via downlink beams may be precoded such that they do not match (e.g., correspond or coordinate with) a demodulation mode or demodulation architecture used by a UE to demodulate the received downlink signals. This mismatch between the precoding scheme used by the base station to transmit the downlink signals and the demodulation modes or architectures of the UEs may lead to unreliable and inefficient wireless communications, as well as undesirable power consumption by the base station and/or the UEs.

To avoid a mismatch between the precoding scheme of the base station 105-a and the demodulation modes of the UEs 115-a and 115-b, the wireless communications system 200 may support reciprocity-based beamforming for architecture-aware UEs 115-a and 115-b. In some examples, the UEs 115-a and 115-b may transmit UE capability messages 215-a and 215-b, respectively, to the base station 105-a. Each UE capability message 215 may include an indication of at least one of a first demodulation mode or a second demodulation mode supported by the respective UE 115.

In some aspects, the first demodulation mode may correspond to a first demodulation procedure associated with a set of antenna ports at the respective UE 115. The set of antenna ports may be an example of a full set of antenna ports at a UE 115, a set of antenna ports of a panel at the UE 115, or any other set of antenna ports at the UE 115. Each antenna port may correspond to a logical system that may include any number of physical antennas at the UEs 115. An antenna port may be an example of an uplink antenna port, a downlink antenna port, or a combination thereof. As described herein, the first demodulation mode may correspond to a first demodulation procedure performed on a downlink signal received at the set of antenna ports at the UE 115-a via the downlink beam 210-a. Comparatively, the second demodulation mode may correspond to multiple demodulation procedures, where each demodulation procedure is associated with a respective subset of the set of antenna ports at the respective UE 115. For instance, the second demodulation mode may correspond to a first demodulation procedure performed on a first downlink signal received at a first subset of antenna ports at the UE 115-b via downlink beam 210-b and a second demodulation procedure performed on a second downlink signal received at a second subset of antenna ports at the UE 115-b via downlink beam 210-c.

In some aspects, a UE capability message 215 may include an indication of a current demodulation mode used by the respective UE 115. For instance, the UE 115-a may be operating in a first demodulation mode and may transmit the UE capability message 215-a including an indication that the UE 115-a is operating in the first demodulation mode. By way of another example, the UE 115-b may be operating in a second demodulation mode and may transmit the UE capability message 215-b including an indication that the UE 115-b is operating in the second demodulation mode. Additionally or alternatively, a UE capability message 215 may include an indication of a flexible switching mode between the first demodulation mode and the second demodulation mode. In some cases, the UE capability message 215 may further include an indication of a currently active demodulation mode for the UE 115 (e.g., in addition to the indication of the flexible switching mode).

As discussed in further detail herein, the indication of the demodulation mode may be included within a bit field of the UE capability message 215. Additionally or alternatively, a UE capability message 215 may include an indication of a preferred precoder type, where the indication of the preferred precoder type effectively serves as the indication of the first demodulation mode or the second demodulation mode.

The UEs 115-a and 115-b may further transmit a set of SRSs to the base station 105-a based on the indication of the first demodulation mode or the second demodulation mode (e.g., based on an active demodulation mode for the UE 115). For example, the UE 115-a may transmit SRSs from the set of antenna ports of the UE 115-a based on the indication that the UE 115-a is currently operating in the first demodulation mode. By way of another example, the UE 115-b may transmit a first subset of SRSs to the base station 105-a via a first subset of antenna ports of the UE 115-b and may further transmit a second subset of SRSs to the base station 105-b via a second subset of antenna ports of the UE 115-b based on the indication that the UE 115-b is currently operating in the second demodulation mode.

In some cases, a UE 115 may support additional or alternative demodulation modes. In some cases, the UE 115 may support an additional demodulation mode which includes performing three or more separate demodulation procedures. In this regard, the UE 115 may include any number of subsets of antenna ports and may transmit any number of sets of SRSs based on the given demodulation mode.

The base station 105-a may precode one or more downlink signals based on the received UE capability messages 215-a and 215-b and/or the received SRSs. In particular, the base station 105-a may precode the one or more downlink signals based on the indications of a first demodulation mode or a second demodulation mode. For example, upon receiving the UE capability message 215-a including an indication of the first demodulation mode, the base station 105-a may be configured to precode a downlink signal with a precoder (e.g., a single precoder) and transmit the downlink signal via downlink beam 210-a (e.g., a single downlink beam 210) to the UE 115-a based on the indication of the first demodulation mode. Comparatively, upon receiving the UE capability message 215-b including an indication of the second demodulation mode, the base station 105-a may be configured to precode a first downlink signal with a first precoder and precode a second downlink signal with a second precoder and transmit the downlink signals via respective downlink beams 210-b and 210-c to the UE 115-b based on the indication of the second demodulation mode.

The signaling and techniques of the wireless communications system 200 may provide for reciprocity-based beamforming for architecture-aware UEs 115-a and 115-b, thereby reducing and/or preventing mismatches between precoding schemes used by the base station 105-a and demodulation architectures or demodulation modes used by the UEs 115-a and 115-b. Accordingly, aspects of the present disclosure may enable more efficient and reliable wireless communications.

Figure 3:
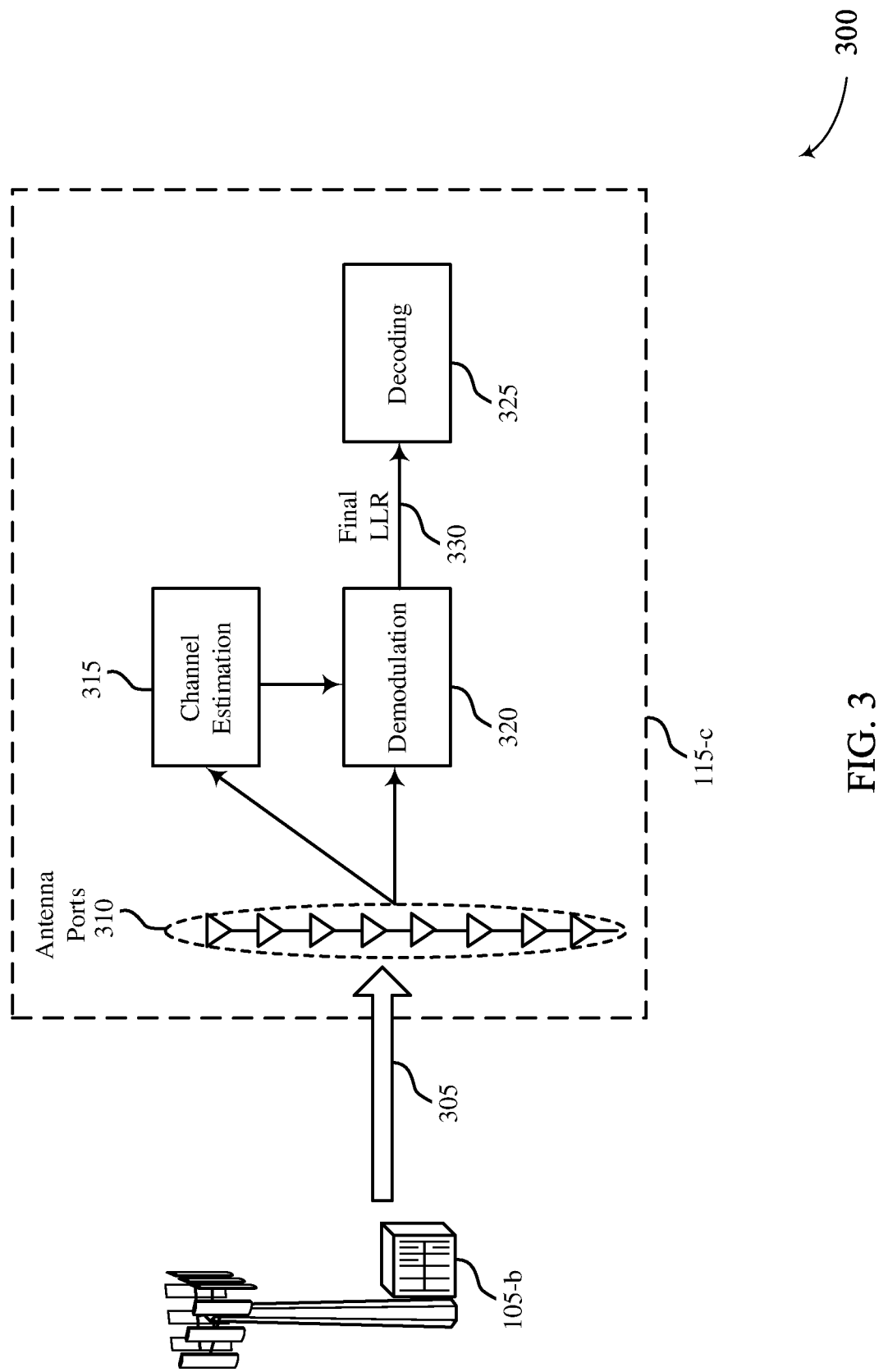
FIGS. 3 and 4 illustrate examples of schematic diagrams that support reciprocity-based beamforming for architecture-aware UEs in accordance with aspects of the present disclosure.

FIG. 3 illustrates an example of a schematic diagram 300 that supports reciprocity-based beamforming for architecture-aware UEs in accordance with aspects of the present disclosure. In some examples, the schematic diagram 300 may implement aspects of a wireless communications system 100 or 200. For example, the schematic diagram 300 may illustrate an example of a first demodulation mode implemented by a UE 115-c, which may be an example of the UEs 115-a and 115-b illustrated in FIG. 2. For instance, in cases where the UE 115-a illustrated in FIG. 2 is operating in the first demodulation mode, the schematic diagram 300 illustrated in FIG. 3 may illustrate the first demodulation mode implemented by the UE 115-a.

In some aspects, the UE 115-c may transmit a UE capability message to the base station 105-b (which may be an example of a base station 105 described with reference to FIGS. 1 and 2), where the UE capability message includes an indication of the first demodulation mode. Additionally or alternatively, the UE 115-c may transmit SRSs based on the first demodulation mode. The base station 105-b may precode a single downlink signal 305 based on the indication of the first demodulation mode and transmit the downlink signal 305 to the UE 115-c. In some aspects, the base station 105-b may be configured to transmit the downlink signal 305 via a downlink beam (e.g., where the downlink beam corresponds to the precoder implemented by the base station 105-b), such as a downlink beam 210-a illustrated in FIG. 2.

The UE 115-c may be configured to receive the downlink signal 305 (via a downlink beam) at a set of antenna ports 310 of the UE 115-c. In this regard, the energy of the downlink signal 305 may be mapped to each antenna port of the set of antenna ports 310 of the UE 115-c (e.g., according to the precoder and/or beamforming implemented at the base station 105-b). At 315, the UE 115-c may be configured to perform one or more channel estimation procedures on the received downlink signal 305. The UE 115-c may be configured to estimate one or more characteristics of the channel of the downlink signal 305 including, but not limited to, an SNR value, a signal-to-interference plus noise (SINR) value, or any other channel measurement. At 320, the UE 115-c may be configured to perform a demodulation procedure on the downlink signal 305 received at the set of antenna ports 310. In some aspects, the demodulation procedure may be performed on the downlink signal 305 based on a channel estimation performed at 315.

At 325, the UE 115-c may be configured to perform one or more decoding procedures on an output of the demodulation procedure. For example, as shown in FIG. 3, the demodulation procedure performed at 320 may output a set of log-likelihood ratio (LLR) values 330, where the LLR values 330 are decoded via the one or more decoding procedures performed at 325. In this regard, the demodulation procedure performed at 320 may demodulate the downlink signal 305 to generate the set of LLR values 330 which may be decoded in signal processing procedures.

It is noted herein that an increased number of antenna ports within a wireless device (e.g., UE 115-c), as compared to other wireless devices (e.g., other UEs 115), may enable the respective wireless device to support greater numbers of downlink layers. For example, as shown in FIG. 3, a UE 115-c with eight antenna ports operating in the first demodulation mode may be able to support (e.g., demodulate and decode) up to eight separate downlink layers concurrently (e.g., eight or fewer downlink layers). However, the capability to decouple eight separate downlink layers with a single demodulation procedure (e.g., the demodulation procedure at 320) may use complex signal demodulation processes, high baseband processing, and high power consumption of the UE 115-c as compared to other demodulation processes or procedures. Such demodulation processes may support improved performance (e.g., as compared to less complex demodulation processes supporting fewer layers) and channel throughput.

Accordingly, the first demodulation mode/architecture illustrated in FIG. 3 may be desirable for a UE 115 in some situations, while other demodulation modes/architectures may be desirable in some other situations. In this regard, some aspects of the present disclosure are directed to signaling which enable a UE 115 to indicate to the base station 105 an intent to transition (e.g., switch) from the first demodulation mode to the second demodulation mode. A UE 115 may be configured to transition from the first demodulation mode to the second demodulation mode, or vice versa, based on any number of factors or characteristics known in the art including, but not limited to, network overhead, channel conditions, power consumption, and the like.

Figure 4:
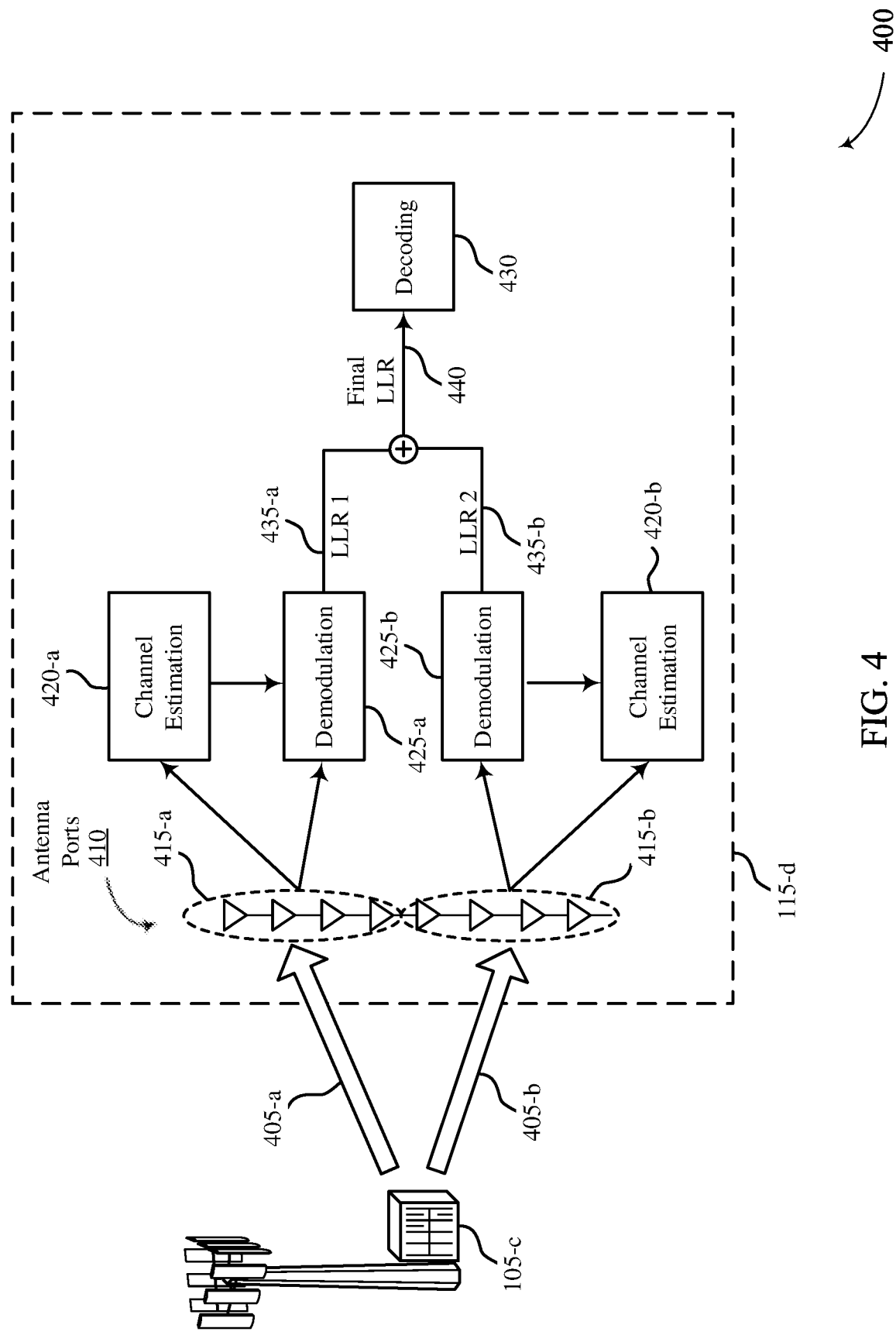

FIG. 4 illustrates an example of a schematic diagram 400 that supports reciprocity-based beamforming for architecture-aware UEs in accordance with aspects of the present disclosure. In some examples, the schematic diagram 400 may implement aspects of a wireless communications system 100 or 200. For example, the schematic diagram 400 may illustrate an example of a second demodulation mode implemented by a UE 115-d, which may be an example of the UEs 115-a and 115-b illustrated in FIG. 2. For instance, in cases where the UE 115-b illustrated in FIG. 2 is operating in the second demodulation mode, the schematic diagram 400 illustrated in FIG. 4 may illustrate the second demodulation mode implemented by the UE 115-b.

In some aspects, the UE 115-d may transmit a UE capability message to the base station 105-c (which may be an example of a base station 105 as described with reference to FIGS. 1 through 3), where the UE capability message includes an indication of the second demodulation mode. Additionally or alternatively, the UE 115-d may transmit SRSs based on the second demodulation mode. In some cases, the UE capability message may include an indication of a flexible switching mode between the first demodulation mode (illustrated in FIG. 3) and the second demodulation mode (illustrated in FIG. 4). For example, a UE 115 may include both a demodulation architecture corresponding to FIG. 3 and a demodulation architecture corresponding to FIG. 4, or the UE 115 may include a demodulation architecture supporting functionality to operate as described with reference to FIGS. 3 and 4. In some cases, the UEs 115 may be configured to request to transition from the first demodulation mode to the second demodulation mode, or vice versa. For instance, in some cases, the UE 115-d may be operating in the first demodulation mode and may transmit a message (e.g., a UE feedback message or some other message) including a request to transition from the first demodulation mode to the second demodulation mode. As noted previously herein, a UE 115 may be configured to request to transition from one demodulation mode to another based on channel conditions, power consumption, and the like. For example, the UE 115-d illustrated in FIG. 4 may transmit a UE capability message including a request to transition from the first demodulation mode to the second demodulation mode in order to conserve power and reduce power consumption of the UE 115-d.

In some aspects, the base station 105-c may be configured to precode a first downlink signal 405-a and a second downlink signal 405-b based on the indication of the second demodulation mode. In some aspects, the base station 105-c may be configured to precode the first downlink signal 405-a via a first precoder and precode the second downlink signal 405-b via a second precoder different from the first precoder. Moreover, the base station 105-c may be configured to transmit the first downlink signal 405-a via a first downlink beam and transmit the second downlink signal 405-b via a second downlink beam different from the first downlink beam (e.g., where each downlink beam corresponds to a respective precoder at the base station 105-c). For example, the base station 105-c may be configured to transmit the downlink signal 405-*a* and the downlink signal 405-*b* via the downlink beam 210-*b* and the downlink beam 210-*c*, respectively, as illustrated in FIG. 2.

In some aspects, the base station 105-*c* may be configured to transmit the first downlink signal 405-*a* to a first subset of antenna ports 415-*a* of a set of antenna ports 410 of the UE 115-*d*. Similarly, the base station 105-*c* may be configured to transmit the second downlink signal 405-*b* to a second subset of antenna ports 415-*b* of the set of antenna ports 410 of the UE 115-*d*. In this regard, the energy of the first downlink signal 405-*a* may be mapped to the first subset of antenna ports 415-*a*, and the energy of the second downlink signal 405-*b* may be mapped to the second subset of antenna ports 415-*b* of the UE 115-*d* (e.g., according to the different precoders and/or beamforming implemented at the base station 105-*c*). In some cases, the first subset of antenna ports 415-*a* may be associated with a first panel of the set of antenna ports 410, and the second subset of antenna ports 415-*b* may be associated with a second panel of the set of antenna ports 410. It is noted herein that the set of antenna ports 410 may be associated with any number of panels of the UE 115-*d*. For example, in some cases, the first subset of antenna ports 415-*a* and the second subset of antenna ports 415-*b* may be associated with a single panel.

In some cases, as shown in FIG. 4, the set of antenna ports 410 may be divided in half such that each of the first and second subsets of antenna ports 415-*a* and 415-*b* each include four antenna ports. However, it is to understood that other antenna port configurations may be supported herein. In this regard, the first subset of antenna ports 415-*a* and the second subset of antenna ports 415-*b* may include different numbers of antenna ports in some examples. Furthermore, the set of antenna ports 410 may be divided into any number of subsets of antenna ports 415.

Upon receiving the downlink signals 405-*a* and 405-*b*, the UE 115-*d* may be configured to perform channel estimation procedures and demodulation procedures on the respective downlink signals 405-*a* and 405-*b*. For example, at 420-*a* and 420-*b*, the UE 115-*d* may be configured to perform one or more channel estimation procedures on the first downlink signal 405-*a* and the second downlink signal 405-*b*, respectively. The UE 115-*d* may be configured to estimate one or more characteristics of the channels of the downlink signal 405-*a* and 405-*b* including, but not limited to, SNR values, SINR values, and the like. Continuing with the same example, at 425-*a*, the UE 115-*d* may be configured to perform a first demodulation procedure on the first downlink signal 405-*a* received by the first subset of antenna ports 415-*a*. Similarly, at 425-*b*, the UE 115-*d* may be configured to perform a second demodulation procedure on the second downlink signal 405-*b* received by the second subset of antenna ports 415-*b*. In some aspects, the demodulation procedures performed at 425-*a* and 425-*b* may be based on the channel estimation procedures performed at 420-*a* and 420-*b*.

At 430, the UE 115-*d* may be configured to perform one or more decoding procedures on the respective outputs of the demodulation procedures performed at 425-*a* and 425-*b*. For example, as shown in FIG. 4, the demodulation procedure performed at 425-*a* may output a first set of LLR values 435-*a*, and the second demodulation procedure performed at 425-*b* may output a second set of LLR values 435-*b*. In such an example, the first set of LLR values 435-*a* and the second set of LLR values 435-*b* may be combined to generate a final set of LLR values 440, which may be decoded at 430. The first set of LLR values 435-*a* and the second set of LLR values 435-*b* may be combined using any mathematical techniques, operations, or algorithms known in the art. For example, in some cases, each respective LLR in the first set of LLR values 435-*a* may be added to the corresponding LLR in the second set of LLR values 435-*b* such that the final set of LLR values 440 corresponds to LLR values for both downlink signals 405-*a* and 405-*b*.

Additionally or alternatively, the first and second sets of LLR values 435-*a* and 435-*b* may be combined according to a weighting scheme or scaling coefficients. The weighting scheme or scaling coefficients used to combine the first and second sets of LLR values 435-*a* and 435-*b* may be based on any characteristics known in the art including, but not limited to, channel conditions, characteristics of the first or second downlink signals 405-*a* and 405-*b* (e.g., SNR values, SINR values, channel estimation, etc.), and the like. For example, in cases where the channel for the first downlink signal 405-*a* exhibits a higher SNR than the channel for the second downlink signal 405-*b*, the first set of LLR values 435-*a* may be weighted more significantly than the second set of LLR values 435-*b*.

As compared to the first demodulation mode illustrated in FIG. 3 which is able to concurrently demodulate/decode up to eight downlink layers (e.g., eight or fewer downlink layers), the architecture of the second demodulation mode illustrated in FIG. 4 may be able to demodulate/decode up to four downlink layers (e.g., four or fewer downlink layers). However, the second demodulation mode illustrated in FIG. 4 may benefit from reduced signal processing complexity, reduced baseband processing, and reduced power consumption at the UE 115-*d* (e.g., as compared to more complex demodulation processes supporting greater numbers of layers).

Figures 5A, 5B:
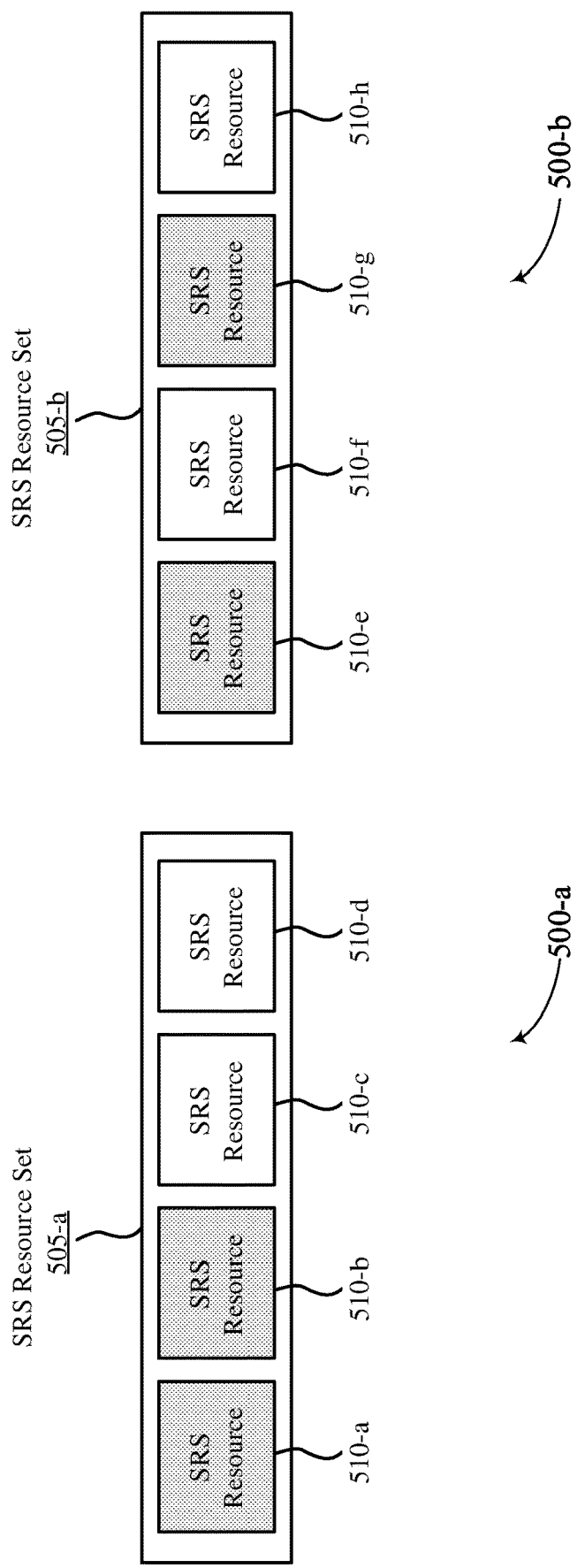
FIGS. 5A and 5B illustrate examples of sounding reference signal (SRS) resource set block diagrams that support reciprocity-based beamforming for architecture-aware UEs in accordance with aspects of the present disclosure.

FIGS. 5A and 5B illustrate examples of SRS resource set block diagrams 500-*a* and 500-*b*, respectively, that support reciprocity-based beamforming for architecture-aware UEs in accordance with aspects of the present disclosure. In some examples, an SRS resource set block diagram 500 may implement aspects of a wireless communications system 100 or 200, a schematic diagram 300 or 400, or some combination thereof. For example, the SRS resource set block diagrams 500-*a* and 500-*b* may illustrate configurations of SRSs transmitted from a UE 115 to a base station 105. In particular, the SRS resource set block diagrams 500-*a* and 500-*b* may illustrate configurations of SRSs transmitted from the UE 115-*b* to the base station 105-*a* while the UE 115-*b* is operating in the second demodulation mode, as described with reference to FIGS. 2 and 4.

In some wireless communications systems (e.g., systems supporting NR technologies or other radio access technologies (RATs)), SRS resources may be configured to span one, two, or four adjacent symbols within a slot, with a number of antenna ports (e.g., up to four antenna ports) of a UE 115 sounding per SRS resource. An SRS resource set 505, as described herein, may correspond to a set of SRSs transmitted by a single UE 115, where the configuration for an SRS resource set 505 may define the SRS resources (e.g., time resources, frequency resources, or the like) for transmitting the SRSs. Generally, SRS resources may be scheduled within a specific portion of a TTI (e.g., the last six symbols of a slot), and the SRS resources may be located after the physical uplink shared channel (PUSCH) resources within a given slot. In some aspects, an SRS resource set 505 may be scheduled periodically, aperiodically (e.g., signaled/scheduled by downlink control information (DCI)), semi-persistently, or the like. Moreover, an SRS transmission may be wideband or over a sub-band and, in some cases, may exhibit a bandwidth which is a multiple of four physical resource blocks (PRBs).

In some aspects, a UE 115 may be configured with multiple SRS resources 510, which may be grouped into an SRS resource set 505 depending on the use case (e.g., antenna switching, codebook-based, non-codebook based, beam management, etc.). For example, SRS antenna switching may enable downlink beamforming (e.g., downlink signal precoding) in TDD bands by exploring channel reciprocity. Some UEs 115 may be configured to support SRS antenna switching for "1T2R," "2T4R," 1T4R, "1T4R/2T4R," or "T=R" antenna configurations described in an "xTyR" format, where "x" represents the number of transmit chains, and "y" represents the number of antenna ports for transmitting SRSs. As described herein, some UEs 115 may be configured to support SRS antenna switching for "1T8R," "2T8R," "4T8R," "1T6R," "2T6R," "4T6R," or similar antenna configurations based on implementing the first or second demodulation mode.

In some cases, a UE 115 may be configured to sound each respective antenna port of the UE 115 in each symbol of a slot configured with SRS resources, such that all antenna ports are sounded within a symbol (e.g., a symbol including SRS resources 510). This may be referred to as a "full sounding" configuration. However, in some aspects, the full sounding configuration may cause a mismatch between a precoding scheme used for downlink signals at the base station 105 and a demodulation mode used by the UE 115. For example, in cases where the UE 115 is operating in the second demodulation mode (as illustrated in FIG. 4), transmitting SRSs to the base station in a full sounding configuration may cause the base station 105 to incorrectly assume the UE 115 is operating in the first demodulation mode. In particular, due to the fact that each antenna port of the UE 115 is sounded within the SRS in the full sounding configuration, the base station 105 may assume the UE 115 is operating in the first demodulation mode, and may transmit downlink signals accordingly. In this example, due to the fact that the UE 115 is operating in the second demodulation mode and the downlink signals were transmitted according to the first demodulation mode (e.g., using a single downlink beam directed towards the full set of antenna ports, rather than using separate downlink beams directed towards separate subsets of the full set of antenna ports), there exists a mismatch between the precoding scheme of the base station 105 and the demodulation mode of the UE 115. This mismatch may decrease the efficiency and reliability of wireless communications within the system.

Accordingly, some aspects of the present disclosure are directed to wireless communications including SRSs which enable an architecture-aware understanding of a demodulation mode used by the UE 115. In this regard, aspects of the present disclosure may reduce or eliminate the possibility of a mismatch between precoding schemes used by the base station 105 and demodulation modes used by the UE 115.

In some aspects, a base station 105 may transmit a configuration message to a UE 115, where the configuration message includes an indication of an SRS resource set configuration for transmitting the set of SRSs. The UE 115 may transmit SRSs to the base station 105 based on the configuration message (e.g., based on the SRS resource set configuration).

For example, in some cases, the base station 105 may transmit a configuration message including an indication of a configuration for an SRS resource set 505-a. The SRS resource set 505-a may include a first SRS resource 510-a, a second SRS resource 510-b, a third SRS resource 510-c, and a fourth SRS resource 510-d. In some aspects, the UE 115 may transmit SRSs in the first and second SRS resources 510-a and 510-b within the SRS resource set 505-a by a first subset of antenna ports, such as the first subset of antenna ports 415-a illustrated in FIG. 4. Similarly, the UE 115 may transmit SRSs in the third and fourth SRS resources 510-c and 510-d within the SRS resource set 505-a by a second subset of antenna ports (e.g., distinct from the first subset of antenna ports), such as the second subset of antenna ports 415-b illustrated in FIG. 4. In particular, a UE 115 may sound the first antenna port and the second antenna port of the set of antenna ports 410 in the first SRS resource 510-a, and may further sound the third antenna port and the fourth antenna port of the set of antenna ports 410 in the second SRS resource 510-b. Similarly, the UE 115 may sound the fifth antenna port and the sixth antenna port of the set of antenna ports 410 in the third SRS resource 510-c, and may further sound the seventh antenna port and the eighth antenna port of the set of antenna ports 410 in the fourth SRS resource 510-d. In this way, the UE 115 may sound each antenna port in the SRS resource set 505-a.

In this regard, the first subset of SRSs may be transmitted via the first subset of antenna ports 415-a via a first set of consecutive SRS resources 510-a and 510-b of the SRS resource set 505-a. Moreover, the second subset of SRSs may be transmitted via the second subset of antenna ports 415-b via a second set of consecutive SRS resources 510-c and 510-d of the SRS resource set 505-a.

Additionally or alternatively, the base station 105 may transmit a configuration message including an indication of a configuration for a SRS resource set 505-b. The SRS resource set 505-b may include a first SRS resource 510-e, a second SRS resource 510-f, a third SRS resource 510-g, and a fourth SRS resource 510-h. In some aspects, the UE 115 may transmit SRSs in the first and third SRS resources 510-e and 510-g within the SRS resource set 505-b by the first subset of antenna ports 415-a illustrated in FIG. 4 and may transmit SRSs in the second and fourth SRS resources 510-f and 510-h within the SRS resource set 505-b by the second subset of antenna ports 415-b illustrated in FIG. 4. In particular, the UE 115 may sound the first antenna port and the second antenna port of the set of antenna ports 410 in the first SRS resource 510-e, and may further sound the third antenna port and the fourth antenna port of the set of antenna ports 410 in the third SRS resource 510-g. Similarly, the UE 115 may sound the fifth antenna port and the sixth antenna port of the set of antenna ports 410 in the second SRS resource 510-f, and may further sound the seventh antenna port and the eighth antenna port of the set of antenna ports 410 in the fourth SRS resource 510-h. In this regard, the first subset of SRSs and the second subset of SRSs may be transmitted via interleaved SRS resources 510-e, 510-f, 510-g, and 510-h of the SRS resource set 505-b.

Furthermore, the UE 115 may be configured to transmit in the SRS resources 510 based on the configuration message received from the base station 105. For example, the configuration message (e.g., a radio resource control (RRC) configuration message including an "SRS-Resource" RRC configuration) may associate each SRS resource 510 with a label that maps the SRS resource 510 to a specific downlink beam. For example, the "SRS-Resource" RRC configuration may include a downlink beam indicator (e.g., a beamFormIndex field) indicating a first downlink beam index (e.g., corresponding to the first subset of antenna ports) or a second downlink beam index (e.g., corresponding to the second subset of antenna ports). A base station 105 receiving the SRSs may perform precoding by associating each SRS to a specific downlink beamforming (e.g., based on the downlink beam index for the SRS resource 510 in which the SRS is received) and, correspondingly, a specific precoder.

The configuration message including the indication of the SRS resource set configuration may be transmitted via any configuration signaling known in the art including, but not limited to, DCI signaling, PDCCH signaling, RRC signaling, and the like. Additionally, the configuration message transmitted by the base station 105 may configure any number of characteristics of the SRS resource sets 505-a and 505-b known in the art. For example, in some cases, the configuration message may include a periodicity (e.g., time interval) between transmissions of the SRS resource sets 505. In some cases, the configuration message may include an indication for the UE 115 to transmit iterations of the SRS resource set 505 at regular, periodic intervals. Additionally or alternatively, the configuration message may include an indication for the UE 115 to transmit iterations of the SRS resource set 505 aperiodically. In this regard, the configuration message may include an indication of an SRS trigger, a slot offset, or both where the slot offset indicates an offset between the SRS trigger and a slot which is to include the SRS resource set 505.

By way of another example, the configuration message may include an indication of a guard band between each of the respective SRS resources 510-a, 510-b, 510-c, and 510-d or SRS resources 510-e, 510-f, 510-g, and 510-h. For instance, the configuration message transmitted by the base station 105 may include an indication of a time interval (e.g., guard band) to be placed between each of the respective SRS resources 510 in order to prevent interference and improve an SNR of the transmitted SRSs in an SRS resource set 505.

Figure 6:
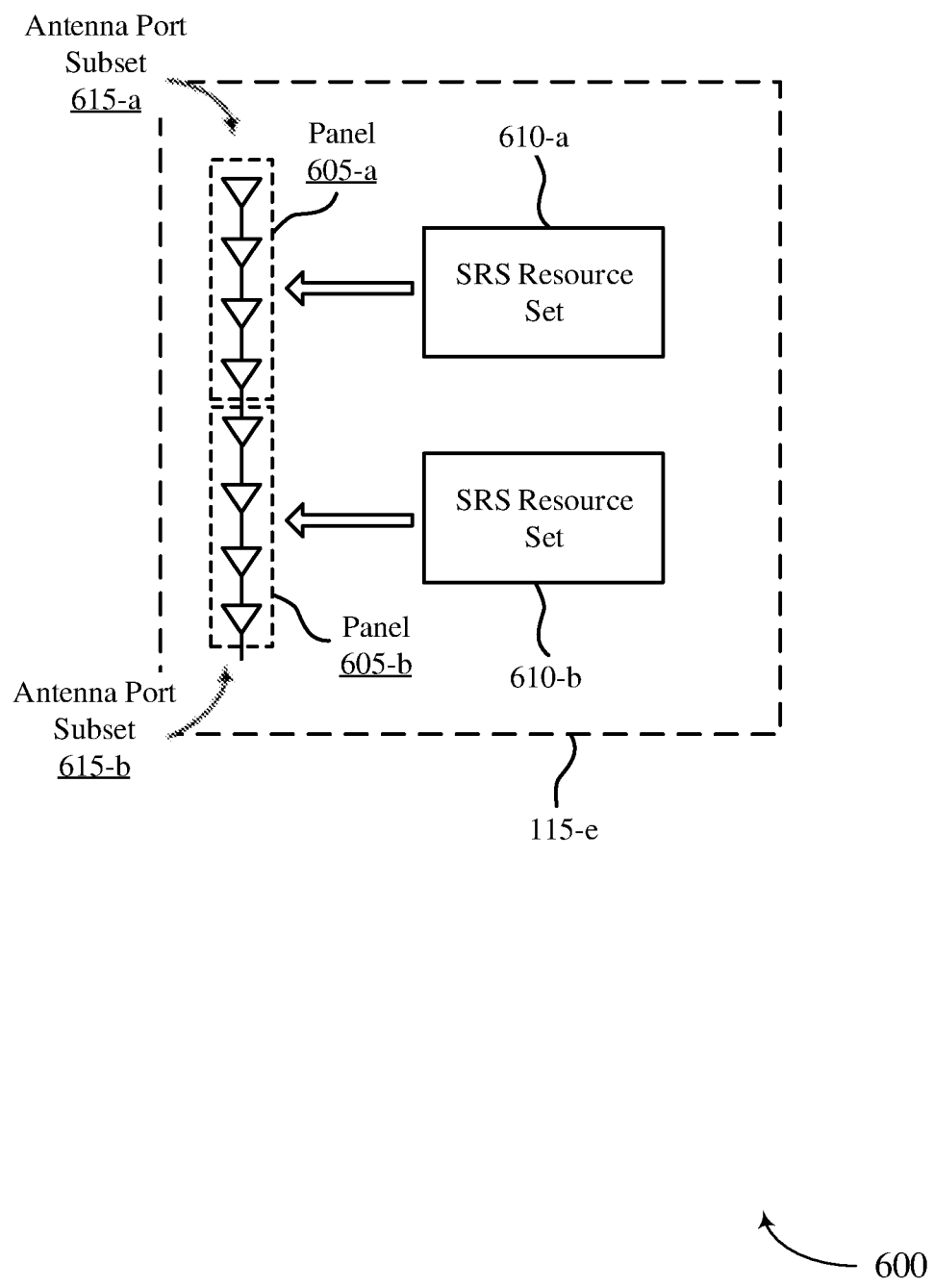
FIG. 6 illustrates an example of a schematic diagram that supports reciprocity-based beamforming for architecture-aware UEs in accordance with aspects of the present disclosure.

FIG. 6 illustrates an example of a schematic diagram 600 that supports reciprocity-based beamforming for architecture-aware UEs in accordance with aspects of the present disclosure. In some examples, the schematic diagram 600 may implement aspects of a wireless communications system 100 or 200, schematic diagrams 300 or 400, SRS resource set block diagrams 500-a or 500-b, or any combination thereof. For example, the schematic diagram 600 illustrates an example of SRS resource sets 610-a and 610-b corresponding to the various antenna ports of a UE 115-e.

As shown in FIG. 6, a UE 115-e may include eight antenna ports, where the eight antenna ports are divided into a first subset of antenna ports 615-a and a second subset of antenna ports 615-b. In particular, the first subset of antenna ports 615-a may include the first antenna port, the second antenna port, the third antenna port, and the fourth antenna port. Conversely, the second subset of antenna ports 615-b may include the fifth antenna port, the sixth antenna port, the seventh antenna port, and the eighth antenna port. In this regard, the first subset of antenna ports 615-a may correspond to a first panel 605-a (e.g., first antenna panel 605-a), and the second subset of antenna ports 615-b may correspond to a second panel 605-b (e.g., second antenna panel 605-b). In some cases, the different panels 605 may correspond to different labels for SRS resource set configuration (e.g., as opposed to corresponding to different physical or logical structures at the UE 115-e). The subsets of antenna ports 615 may correspond to any number of panels 605 for the purposes of SRS resource configuration.

In some aspects, the UE 115-e may be configured with a first SRS resource set 610-a and a second SRS resource set 610-b. In some aspects, the SRS resource sets 610-a and 610-b may be configured according to one or more configuration messages received from a base station 105 (e.g., explicitly based on a configuration field, such as a beam label, or implicitly based on a panel identifier). In particular, the SRS resource sets 610-a and 610-b may be configured, in some examples, according to the SRS resource sets 505-a and 505-b illustrated in FIG. 5.

In some aspects, the first SRS resource set 610-a may correspond to the first panel 605-a, and the second SRS resource set 610-b may correspond to the second panel 605-b. In this regard, the UE 115-e may be configured to transmit the first subset of SRSs in the first SRS resource set 610-a and may be configured to transmit the second subset of SRSs in the second SRS resource set 610-b.

In this example, illustrated in FIG. 6, the base station 105 may be configured to receive SRSs in the first SRS resource set 610-a from the first panel 605-a, and may receive SRSs in the second SRS resource set 610-b from the second panel 605-b. The base station 105 may estimate the channel from each panel 605-a and 605-b (e.g., estimate the channel from each subset of antenna ports 615-a and 615-b) based on the SRS resource sets 610-a and 610-b and may compute two different beams for the respective panels 605-a and 605-b (e.g., using two different precoders). In this regard, the base station 105 may precode and transmit a first downlink signal via a first beam to the first panel 605-a based on the first SRS resource set 610-a (e.g., based on the strengths of the received SRSs in the first SRS resource set 610-a). Similarly, the base station 105 may precode and transmit a second downlink signal via a second beam to the second panel 605-b based on the second SRS resource set 610-b (e.g., based on the strengths of the received SRSs in the second SRS resource set 610-b).

Figure 7:
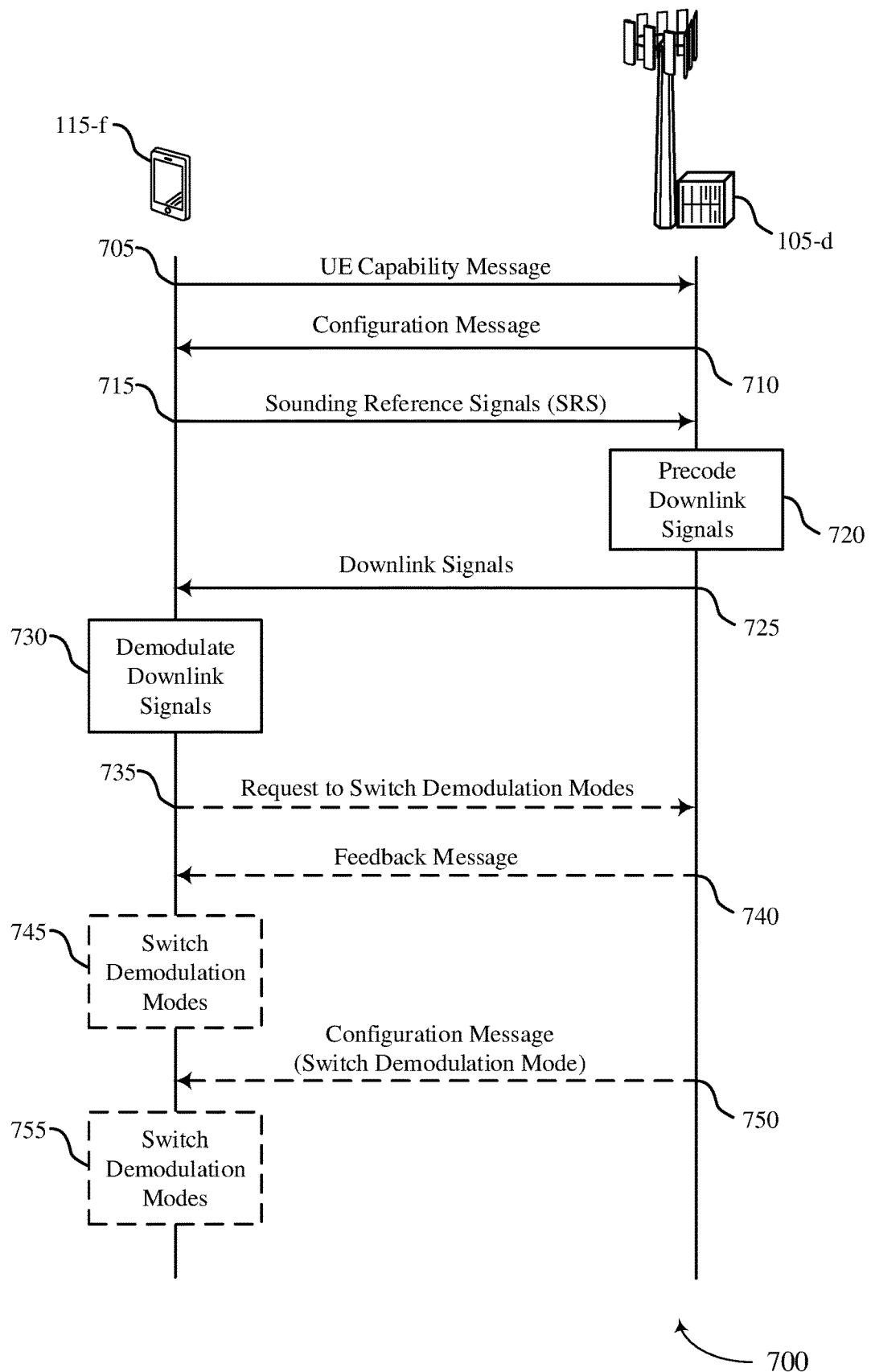
FIG. 7 illustrates an example of a process flow that supports reciprocity-based beamforming for architecture-aware UEs in accordance with aspects of the present disclosure.

FIG. 7 illustrates an example of a process flow 700 that supports reciprocity-based beamforming for architecture-aware UEs in accordance with aspects of the present disclosure. In some examples, the process flow 700 may implement aspects of a wireless communications system 100 or 200, a schematic diagram 300 or 400, an SRS resource set block diagram 500-a or 500-b, a schematic diagram 600, or any combination thereof. For example, the process flow 700 may illustrate a UE 115-f transmitting a UE capability message including an indication of a first demodulation mode or a second demodulation mode, receiving one or more downlink signals based on the UE capability message, and demodulating the one or more downlink signals based on the indication of the first demodulation mode or the second demodulation mode, as described with reference to FIGS. 1 through 6.

In some examples, the operations performed in process flow 700 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

In some cases, the process flow 700 may include a UE 115-f and a base station 105-d, which may be examples of corresponding devices as described herein. In particular, the UE 115-f and the base station 105-d illustrated in FIG. 7 may be examples of a UE 115 and a base station 105 as described with reference to FIGS. 1 through 6.

At 705, the UE 115-f may transmit a UE capability message to the base station 105-d. The UE capability message may include an indication of at least one of the first demodulation mode or the second demodulation mode supported by the UE 115-f. In some aspects, the first demodulation mode corresponds to a demodulation procedure associated with a set of antenna ports at the UE 115-f (as illustrated in FIG. 3), and the second demodulation mode corresponds to a set of demodulation procedures associated with respective subsets of the set of antenna ports at the UE 115-f (as illustrated in FIG. 4). In some aspects, the UE capability message may include an indication of a flexible switching mode between the first demodulation mode and the second demodulation mode.

The indication for the first demodulation mode, the second demodulation mode, or the flexible switching mode may be included within a bit field of the UE capability message. For example, as noted previously herein, SRS antenna switching configurations may be described in an "xTyR" format. In some aspects, the indication of the demodulation modes may be indicated via an "xTyRz" format, where "z" indicates the first demodulation mode, the second demodulation mode, or the flexible switching mode. For example, "z=1" may indicate the first demodulation mode, and "z=2" may indicate the second demodulation mode, or vice versa. By way of another example, "z=0" may indicate the first demodulation mode, and "z=1" may indicate the second demodulation mode, or vice versa. In such an example, "z=2" may indicate the flexible switching mode. The "xTyRz" format and/or the "z" value may be indicated within one or more bit fields of the UE capability message. Additionally or alternatively, the UE capability message may include a demodulation mode field (e.g., a one-bit indicator indicating demodulation mode one or two), a flexible switching mode field (e.g., a one-bit indicator indicating either support for flexible switching or no support for flexible switching), or some combination of these fields.

Additionally or alternatively, the UE capability message may include an indication of a preferred precoder type, where the indication of the preferred precoder type serves as the indication of the first demodulation mode or the second demodulation mode. For example, in some cases, the UE capability message may include an indication of a preference for a single precoder. In this example, the preference for the single precoder may serve as an indication for the first demodulation mode. By way of another example, in other cases, the UE capability message may include an indication of a preference for a set of two or more precoders (e.g., a first precoder and a second precoder). In this example, the preference for the set of two or more precoders may serve as an indication for the second demodulation mode. In some examples, the "xTyRz" format may specify the preferred precoder type, with the "z" parameter for the preferred precoder implicitly indicating a demodulation mode of the UE 115-f.

At 710, the base station 105-d may transmit a configuration message to the UE 115-f. The configuration message may include an indication of an SRS resource set configuration for transmitting the set of SRSs. In some cases, the configuration message may be based on the indication of the first demodulation mode, the second demodulation mode, or the flexible demodulation mode within the UE capability message. The configuration message including the indication of the SRS resource set configuration may be transmitted via any configuration signaling known in the art including, but not limited to, DCI signaling, PDCCH signaling, RRC signaling, and the like. In some aspects, the configuration message may include an indication of a configuration for the SRS resource set 505-a or the SRS resource set 505-b, as illustrated in FIG. 5.

At 715, the UE 115-f may transmit a set of SRSs to the base station 105-d. Each SRS may correspond to a respective antenna port of a set of antenna ports of the UE 115-f. In some cases, the UE 115-f may transmit the set of SRSs to the base station 105-d based on the indication of the demodulation mode (e.g., first demodulation mode, second demodulation mode, flexible switching mode) within the UE capability message. Additionally or alternatively, the UE 115-f may transmit the set of SRSs to the base station 105-d based on the configuration message received from the base station 105-d.

For example, in cases where the UE capability message includes an indication of the first demodulation mode, the UE 115-f may transmit the set of SRSs to the base station 105-d via the set of antenna ports. By way of another example, in cases where the UE capability message includes an indication of the second demodulation mode, the UE 115-f may transmit a first subset of SRSs of the set of SRSs to the base station 105-d via a first subset of antenna ports of the set of antenna ports, and transmit a second subset of SRSs of the set of SRSs different from the first subset of SRSs to the base station 105-d via a second subset of antenna ports of the set of antenna ports.

The set of SRSs transmitted at 715 may be transmitted according to the configuration/format of the SRS resource sets 505-a and 505-b illustrated in FIG. 5. For example, in cases where the UE capability message includes an indication of the second demodulation mode, the first subset of SRSs may be transmitted via a first set of consecutive SRS resources 510-a and 510-b of the SRS resource set 505-a, and the second subset of SRSs may be transmitted via a second set of consecutive SRS resources 510-c and 510-d of the SRS resource set 505-a. Additionally or alternatively, the first subset of SRSs and the second subset of SRSs may be transmitted via interleaved SRS resources 510-e, 510-f, 510-g, and 510-h of the SRS resource set 505-b. Furthermore, the first subset of SRSs (e.g., in a first SRS resource set 610-a) may be transmitted via a first panel 605-a (e.g., a first subset of antenna ports 415-a), and the second subset of SRSs (e.g., in a second SRS resource set 610-b) may be transmitted via a second panel 605-b (e.g., a second subset of antenna ports 415-b).

At 720, the base station 105-d may precode one or more downlink signals. The base station 105-d may precode the one or more downlink signals based on the indication of the demodulation mode within the UE capability message and/ or on the SRSs. The precoding may involve, or otherwise correspond to, downlink beamforming at the base station 105-d.

For example, the base station 105-d may estimate the channel for the set of antenna ports of the UE 115-f based on the SRSs received at 715. For instance, in cases where the UE 115-f is operating in the first demodulation mode and transmits the SRSs via the set of antenna ports, the base station 105-d may estimate a channel for the set of antenna ports based on the set of SRSs. Similarly, in cases where the UE 115-f is operating in the second demodulation mode, the base station 105-d may receive a first subset of SRSs from a first subset of antenna ports of the UE 115-f and may further receive a second subset of SRSs from a second subset of antenna ports of the UE 115-f. In this example, the base station 105-d may estimate a first channel for the first subset of antenna ports based on the first subset of SRSs and may estimate a second channel for the second subset of antenna ports based on the second subset of SRSs. In these examples, the base station 105-d may precode the one or more downlink signals based on the channel estimations.

The base station 105-*d* may additionally or alternatively precode the one or more downlink signals based on the indication of the demodulation mode received via the UE capability message. For example, in cases where the UE capability message includes an indication of the first demodulation mode, the base station 105-*d* may precode a single downlink signal with a single precoder based on the indication of the first demodulation mode. By way of another example, in cases where the UE capability message includes an indication of the second demodulation mode, the base station 105-*d* may precode a first downlink signal with a first precoder and a second downlink signal with a second precoder different from the first precoder based on the indication of the second demodulation mode.

At 725, the base station 105-*f* may transmit the one or more downlink signals to the UE 115-*f*. The downlink signals may be transmitted from the base station 105-*f* to the UE 115-*f* based on the indication of the demodulation mode and the precoding performed at 720. For example, in cases where the UE 115-*f* is operating in the first demodulation mode, the UE 115-*f* may receive the single downlink signal via a single downlink beam based on the first demodulation mode. In this example the UE 115-*f* may receive the single downlink signal via the set of antenna ports. Conversely, in cases where the UE 115-*f* is operating in the second demodulation mode, the UE 115-*f* may receive the first downlink signal via a first downlink beam and may receive the second downlink signal via a second downlink beam based on the second demodulation mode. In this example, the UE 115-*f* may receive the first downlink signal via the first subset of antenna ports (e.g., a first panel) and may receive the second downlink signal via the second subset of antenna ports (e.g., a second panel).

At 730, the UE 115-*f* may demodulate the one or more downlink signals. The UE 115-*f* may demodulate the one or more downlink signals according to the first demodulation mode or the second demodulation mode.

For example, when operating in the first demodulation mode, the UE 115-*f* may perform a demodulation procedure on the downlink signal received at the set of antenna ports. In some cases, the demodulation procedure may output a set of LLR values (e.g., final set of LLR values 330) which may be used as an input for decoding and signal processing procedures.

By way of another example, when operating in the second demodulation mode, the UE 115-*f* may perform a first demodulation procedure on the first downlink signal received at the first subset of antenna ports and may perform a second demodulation procedure on the second downlink signal received at the second subset of antenna ports. In some aspects, demodulating the one or more downlink signals may further include combining a first output of the first demodulation procedure and a second output of a second demodulation procedure. For instance, in some cases, the first demodulation procedure may output a first set of LLR values (e.g., first set of LLR values 435-*a*), and the second demodulation procedure may output a second set of LLR values (e.g., second set of LLR values 435-*b*). In this example, the UE 115-*f* may combine the first set of LLR values and the second set of LLR values to generate a final set of LLR values (e.g., final set of LLR values 440), which may be used as an input for decoding and signal processing procedures. The outputs of the first demodulation procedure and the second demodulation procedure (e.g., the first set of LLR values and the second set of LLR values) may be combined using any mathematical techniques, operations, or algorithms known in the art (e.g., including, but not limited to, weighting the LLRs based on channel measurements).

In some aspects, the UE 115-*f* may demodulate and/or decode varying numbers of downlink layers based on the given demodulation mode. In particular, the UE 115-*f* may demodulate eight or fewer downlink layers while operating in the first demodulation mode, and may demodulate four or fewer downlink layers while operating in the second demodulation mode.

At 735, the UE 115-*f* may transmit a request to switch demodulation modes. The request to switch demodulation modes may include a request to transition from the first demodulation mode to the second demodulation mode, or vice versa. In some cases, the request to switch demodulation modes may be based on an indication of the flexible switching mode between the first demodulation mode and the second demodulation mode. The request may be an example of a UE feedback report (e.g., on a physical uplink control channel (PUCCH) or a PUSCH), such as a channel state feedback (CSF) report, a UE assistance information message, or any other message.

At 740, the base station 105-*f* may transmit a feedback message. The feedback message may be transmitted in response to (e.g., based on) the request to switch demodulation modes received at 735. In this regard, the feedback message may include an acknowledgement for the UE 115-*f* to transition from the first demodulation mode to the second demodulation mode, or vice versa. Additionally or alternatively, the feedback message may include a negative acknowledgement for the UE 115-*f* restricting the UE 115-*f* from transitioning demodulation modes.

At 745, the UE 115-*f* may switch (i.e., transition) between demodulation modes. In some aspects, the UE 115-*f* may transition from the first demodulation mode to the second demodulation mode, or vice versa, based on the feedback message received at 740.

At 750, the base station 105-*d* may transmit a configuration message to the UE 115-*f*, the configuration message including an indication for the UE 115-*f* to transition from the first demodulation mode to the second demodulation mode, or vice versa. In this regard, in addition or alternative to the UE 115-*f* requesting to switch demodulation modes on its own, the base station 105-*d* may request that the UE 115-*f* switch demodulation modes.

The base station 105-*d* and/or the UE 115-*f* may request that the UE 115-*f* switch demodulation modes based on any number of factors including, but not limited to, channel characteristics, channel overhead, power consumption, and the like. For example, in situations with high channel overhead, the base station 105-*d* may transmit the configuration message at 750 including a request for the UE 115-*f* to transition from the second demodulation mode to the first demodulation mode in order to allow the UE 115-*f* to demodulate an increased number of downlink layers concurrently based on the high channel overhead. In another example, the UE 115-*f* may transition from the first demodulation mode to the second demodulation mode in order to conserver power at the UE 115-*f*.

At 755, the UE 115-*f* may switch (i.e., transition) between demodulation modes. In some aspects, the UE 115-*f* may transition from the first demodulation mode to the second demodulation mode, or vice versa, based on the configuration message received at 750.

Figure 8:
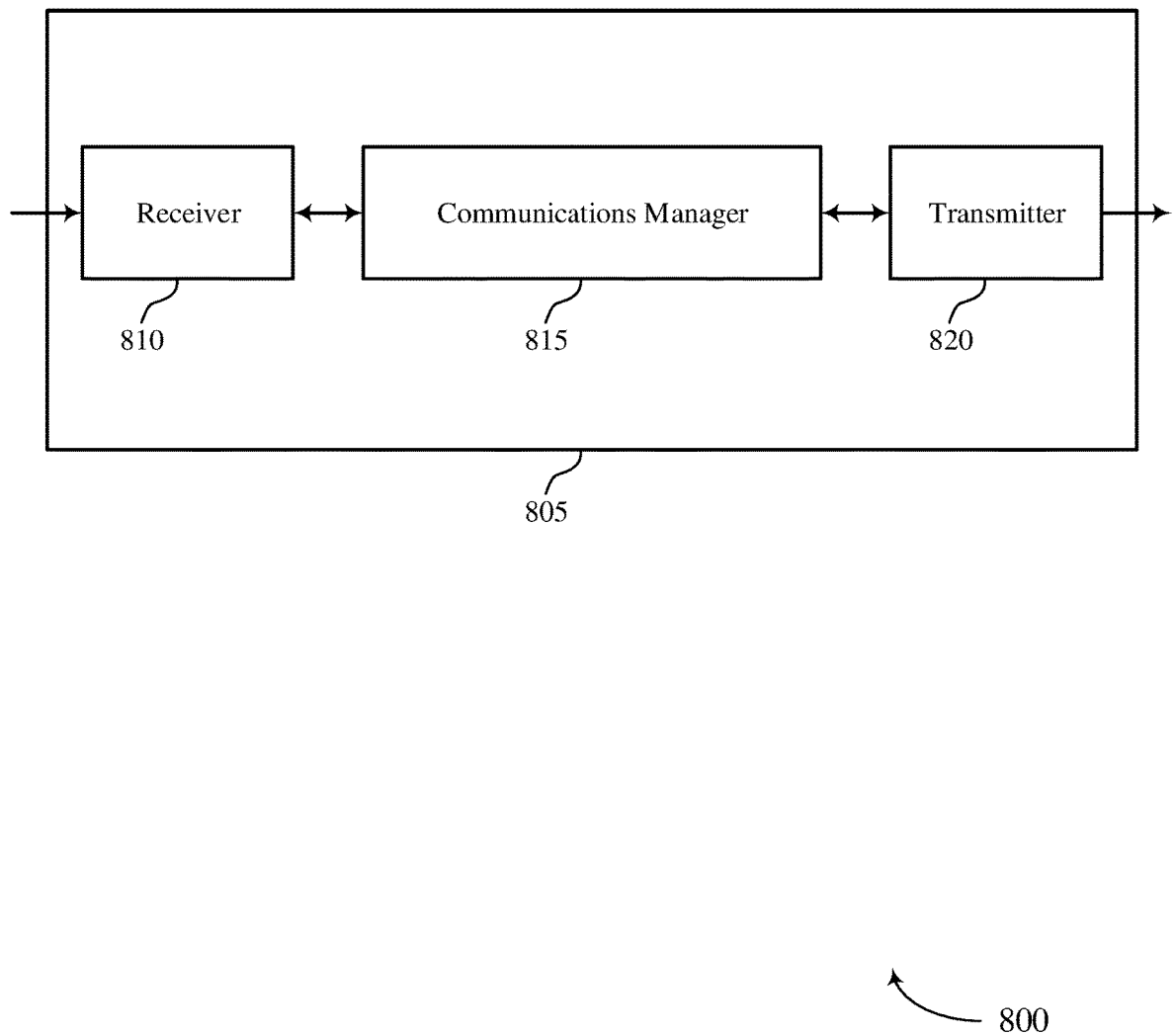
FIGS. 8 and 9 show block diagrams of devices that support reciprocity-based beamforming for architecture-aware UEs in accordance with aspects of the present disclosure.

FIG. 8 shows a block diagram 800 of a device 805 that supports reciprocity-based beamforming for architecture-aware UEs in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to reciprocity-based beamforming for architecture-aware UEs, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may be implemented at a UE. The communications manager 815 may transmit, to a base station, a UE capability message including an indication of at least one of a first demodulation mode supported by the UE or a second demodulation mode supported by the UE, the first demodulation mode corresponding to a demodulation procedure associated with a set of antenna ports at the UE and the second demodulation mode corresponding to a set of demodulation procedures, each of the set of demodulation procedures associated with a respective subset of the set of antenna ports at the UE. Additionally, the communications manager 815 may receive, from the base station, one or more downlink signals via one or more downlink beams, the one or more downlink beams based on the indication of at least one of the first demodulation mode or the second demodulation mode, and demodulate the one or more downlink signals according to the first demodulation mode or the second demodulation mode based on the indication. The communications manager 815 may be an example of aspects of the communications manager 1110 described herein.

The actions performed by the communications manager 815 as described herein may be implemented to realize one or more potential advantages. For example, enabling coordination between a precoding scheme used by a base station 105 and a demodulation mode used at a UE 115 may improve the efficiency and reliability of wireless communications. Additionally, providing the ability to switch between demodulation modes may allow the base station 105 and/or the UE 115 to alleviate network overhead to concurrently demodulate higher numbers of downlink layers. Moreover, the ability to switch between demodulation modes may allow the UE 115 to reduce power consumption.

Based on transmitting the indication of a demodulation mode, a processor of the UE 115 (e.g., a processor controlling the receiver 810, the communications manager 815, the transmitter 820, etc.) may reduce processing resources used for downlink communications. For example, by improving coordination between a base station 105 and the UE 115, the UE 115 may mitigate mismatches between downlink precoding and downlink demodulation. Avoiding such mismatches may reduce the number of retransmissions used to successfully receive downlink information at a UE 115, correspondingly reducing a number of times the processor ramps up processing power and turns on processing units to handle downlink reception.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
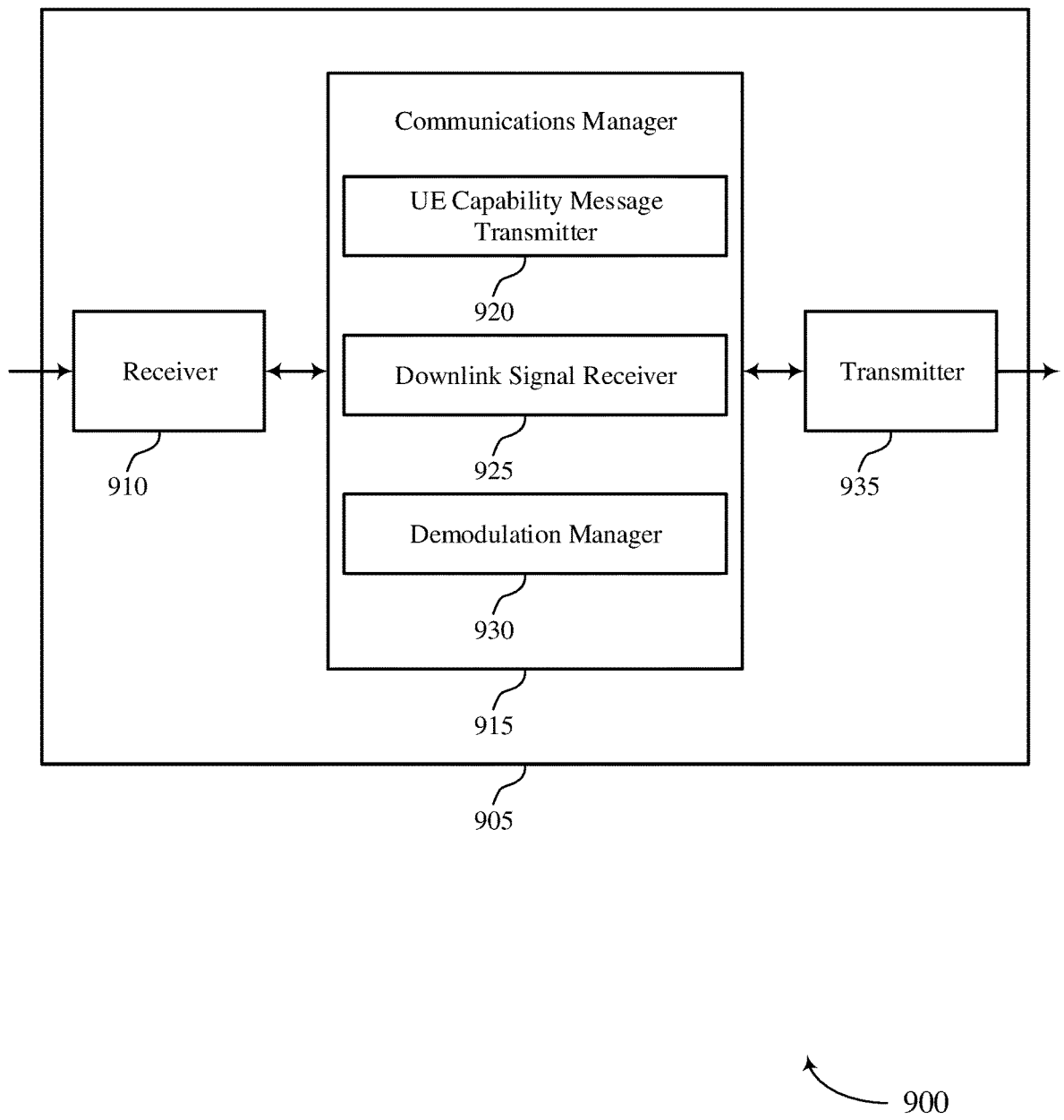

FIG. 9 shows a block diagram 900 of a device 905 that supports reciprocity-based beamforming for architecture-aware UEs in accordance with aspects of the present disclosure. The device 905 may be an example of aspects of a device 805 or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to reciprocity-based beamforming for architecture-aware UEs, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a UE capability message transmitter 920, a downlink signal receiver 925, and a demodulation manager 930. The communications manager 915 may be an example of aspects of the communications manager 1110 described herein. The communications manager 915 may be implemented at a UE.

The UE capability message transmitter 920 may transmit, to a base station, a UE capability message including an indication of at least one of a first demodulation mode supported by the UE or a second demodulation mode supported by the UE, the first demodulation mode corresponding to a demodulation procedure associated with a set of antenna ports at the UE and the second demodulation mode corresponding to a set of demodulation procedures, each of the set of demodulation procedures associated with a respective subset of the set of antenna ports at the UE.

The downlink signal receiver 925 may receive, from the base station, one or more downlink signals via one or more downlink beams, the one or more downlink beams based on the indication of at least one of the first demodulation mode or the second demodulation mode. The demodulation manager 930 may demodulate the one or more downlink signals according to the first demodulation mode or the second demodulation mode based on the indication.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
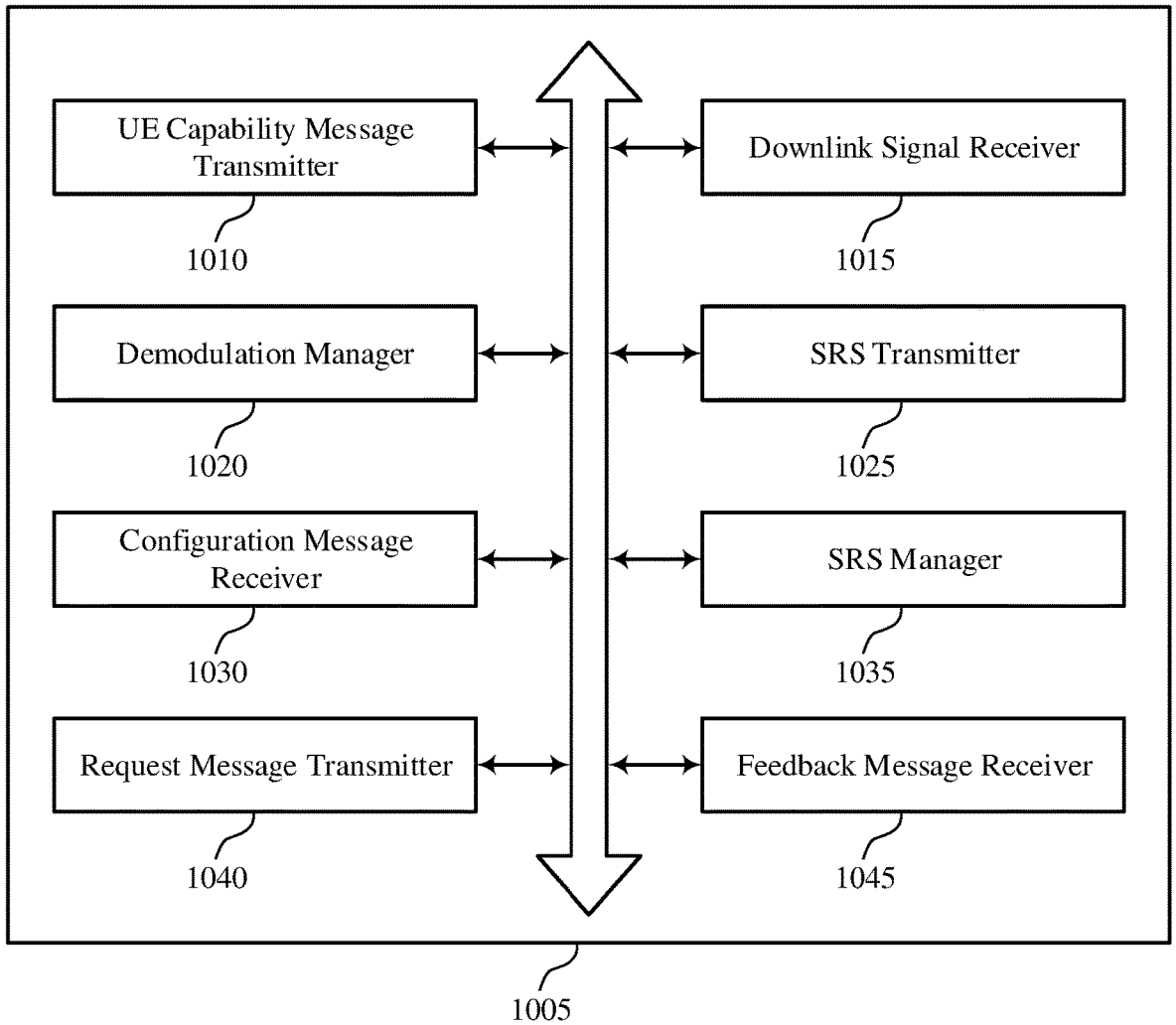
FIG. 10 shows a block diagram of a communications manager that supports reciprocity-based beamforming for architecture-aware UEs in accordance with aspects of the present disclosure.

FIG. 10 shows a block diagram 1000 of a communications manager 1005 that supports reciprocity-based beamforming for architecture-aware UEs in accordance with aspects of the present disclosure. The communications manager 1005 may be an example of aspects of a communications manager 815, a communications manager 915, or a communications manager 1110 described herein. The communications manager 1005 may include a UE capability message transmitter 1010, a downlink signal receiver 1015, a demodulation manager 1020, an SRS transmitter 1025, a configuration message receiver 1030, an SRS manager 1035, a request message transmitter 1040, and a feedback message receiver 1045. Each of these modules may communicate, directly or indirectly, with one another (e.g., via one or more buses).

The UE capability message transmitter 1010 may transmit, to a base station, a UE capability message including an indication of at least one of a first demodulation mode supported by the UE or a second demodulation mode supported by the UE, the first demodulation mode corresponding to a demodulation procedure associated with a set of antenna ports at the UE and the second demodulation mode corresponding to a set of demodulation procedures, each of the set of demodulation procedures associated with a respective subset of the set of antenna ports at the UE.

In some cases, the UE capability message includes an indication of a preferred precoder type, the indication of the preferred precoder type including the indication of at least one of the first demodulation mode or the second demodulation mode.

The downlink signal receiver 1015 may receive, from the base station, one or more downlink signals via one or more downlink beams, the one or more downlink beams based on the indication of at least one of the first demodulation mode or the second demodulation mode. In some examples, the downlink signal receiver 1015 may receive, at the set of antenna ports, a single downlink signal via a single downlink beam based on the first demodulation mode. In some examples, the downlink signal receiver 1015 may receive, at a first subset of antenna ports of the set of antenna ports, a first downlink signal via a first downlink beam. In some examples, the downlink signal receiver 1015 may receive, at a second subset of antenna ports of the set of antenna ports different from the first subset of antenna ports, a second downlink signal via a second downlink beam, where the first downlink signal and the second downlink signal are received based on the second demodulation mode. In some cases, the single downlink signal is associated with a single precoder at the base station. In some cases, the first downlink signal is associated with a first precoder at the base station and the second downlink signal is associated with a second precoder at the base station different from the first precoder.

The demodulation manager 1020 may demodulate the one or more downlink signals according to the first demodulation mode or the second demodulation mode based on the indication. In some examples, the demodulation manager 1020 may perform the demodulation procedure associated with the set of antenna ports on the single downlink signal received at the set of antenna ports. In some examples, the demodulation manager 1020 may perform a first demodulation procedure of the set of demodulation procedures on the first downlink signal received at the first subset of antenna ports. In some examples, the demodulation manager 1020 may perform a second demodulation procedure of the set of demodulation procedures on the second downlink signal received at the second subset of antenna ports. In some examples, the demodulation manager 1020 may combine a first output of the first demodulation procedure and a second output of the second demodulation procedure. In some examples, the demodulation manager 1020 may combine a first log-likelihood ratio value output from the first demodulation procedure and a second log-likelihood ratio value output from the second demodulation procedure.

In some cases, the indication of at least one of the first demodulation mode or the second demodulation mode indicates a flexible switching mode between the first demodulation mode and the second demodulation mode. In some cases, the indication of at least one of the first demodulation mode or the second demodulation mode includes a bit field in the UE capability message indicating at least one of the first demodulation mode, the second demodulation mode, or a flexible switching mode between the first demodulation mode and the second demodulation mode. In some cases, the first demodulation mode is configured to demodulate eight or fewer downlink layers and the second demodulation mode is configured to demodulate four or fewer downlink layers.

The SRS transmitter 1025 may transmit, to the base station, a set of SRSs based on the indication of at least one of the first demodulation mode or the second demodulation mode, where each SRS corresponds to a respective antenna port of the set of antenna ports. In some examples, the SRS transmitter 1025 may transmit a first subset of SRSs of the set of SRSs to the base station via a first subset of antenna ports of the set of antenna ports based on the second demodulation mode. In some examples, the SRS transmitter 1025 may transmit a second subset of SRSs of the set of SRSs different from the first subset of SRSs to the base station via a second subset of antenna ports of the set of antenna ports different from the first subset of antenna ports based on the second demodulation mode. In some examples, the SRS transmitter 1025 may transmit the first subset of SRSs via a first set of consecutive SRS resources of the SRS resource set and transmitting the second subset of SRSs via a second set of consecutive SRS resources of the SRS resource set. In some examples, the SRS transmitter 1025 may transmit the first subset of SRSs and the second subset of SRSs via interleaved SRS resources of the SRS resource set.

The configuration message receiver 1030 may receive a configuration message including an indication of a SRS resource set configuration for transmitting the set of SRSs. In some examples, the configuration message receiver 1030 may receive, from the base station, a configuration message including at least one of an indication for the UE to transition from the first demodulation mode to the second demodulation mode or an indication for the UE to transition from the second demodulation mode to the first demodulation mode.

In some cases, the SRS resource set configuration includes a SRS resource set. In some cases, the first subset of SRSs and the second subset of SRSs are transmitted in the SRS resource set based on the configuration message. In some cases, the SRS resource set configuration includes a first SRS resource set and a second SRS resource set. In some cases, the first subset of SRSs is transmitted in the first SRS resource set. In some cases, the second subset of SRSs is transmitted in the second SRS resource set. In some cases, the first subset of antenna ports corresponds to a first panel associated with the first SRS resource set and the second subset of antenna ports corresponds to a second panel different from the first panel and associated with the second SRS resource set.

The request message transmitter 1040 may transmit, to the base station, a request message including at least one of a request to transition from the first demodulation mode to the second demodulation mode or a request to transition from the second demodulation mode to the first demodulation mode, where transmitting the request message is based on the flexible switching mode between the first demodulation mode and the second demodulation mode. The feedback message receiver 1045 may receive, from the base station and in response to the request message, a feedback message including at least one of an acknowledgement for the UE to transition from the first demodulation mode to the second demodulation mode or an acknowledgement for the UE to transition from the second demodulation mode to the first demodulation mode.

Figure 11:
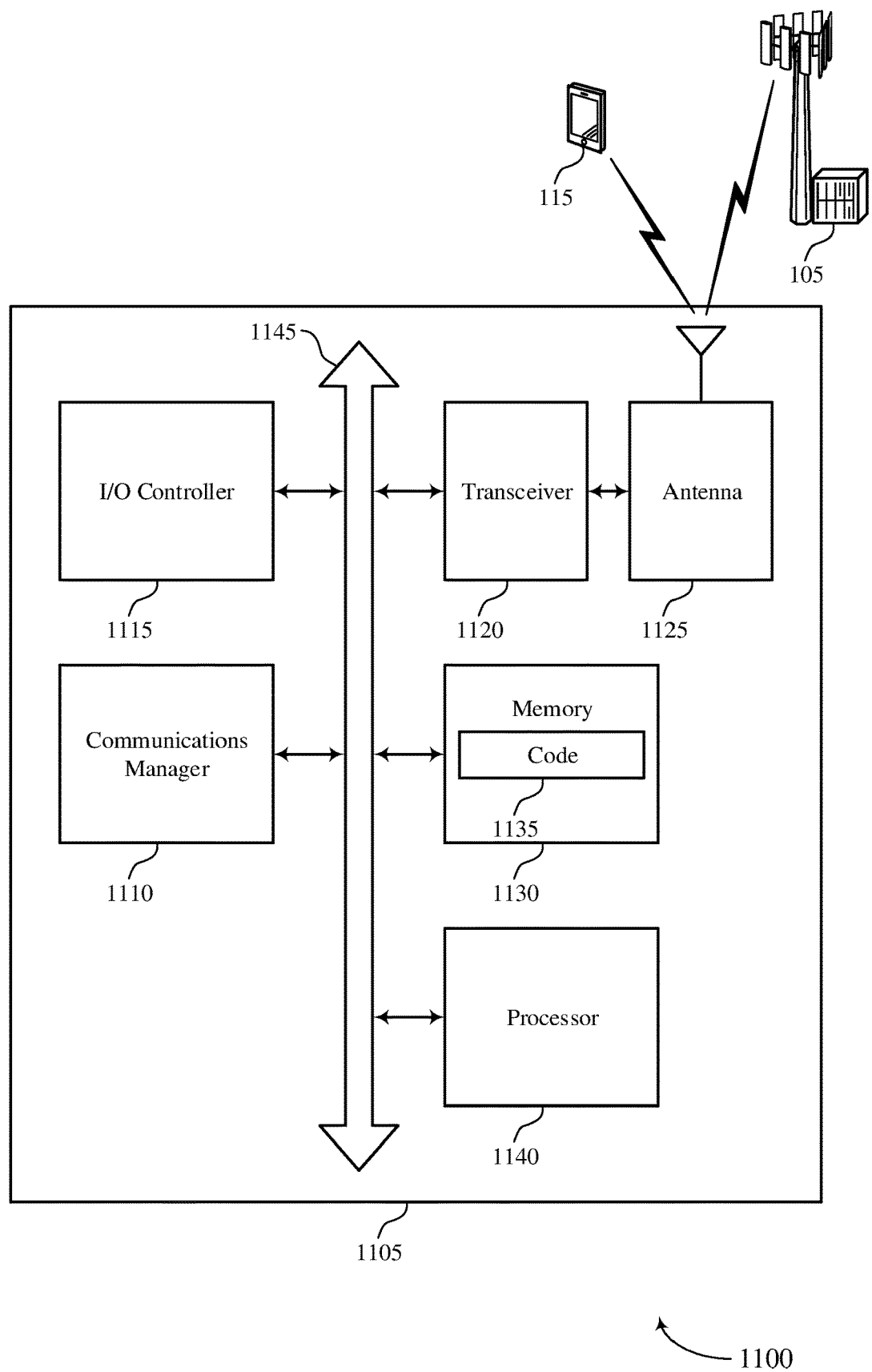
FIG. 11 shows a diagram of a system including a device that supports reciprocity-based beamforming for architecture-aware UEs in accordance with aspects of the present disclosure.

FIG. 11 shows a diagram of a system 1100 including a device 1105 that supports reciprocity-based beamforming for architecture-aware UEs in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may transmit, to a base station, a UE capability message including an indication of at least one of a first demodulation mode supported by the UE or a second demodulation mode supported by the UE, the first demodulation mode corresponding to a demodulation procedure associated with a set of antenna ports at the UE and the second demodulation mode corresponding to a set of demodulation procedures, each of the set of demodulation procedures associated with a respective subset of the set of antenna ports at the UE, receive, from the base station, one or more downlink signals via one or more downlink beams, the one or more downlink beams based on the indication of at least one of the first demodulation mode or the second demodulation mode, and demodulate the one or more downlink signals according to the first demodulation mode or the second demodulation mode based on the indication.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting reciprocity-based beamforming for architecture-aware UEs).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
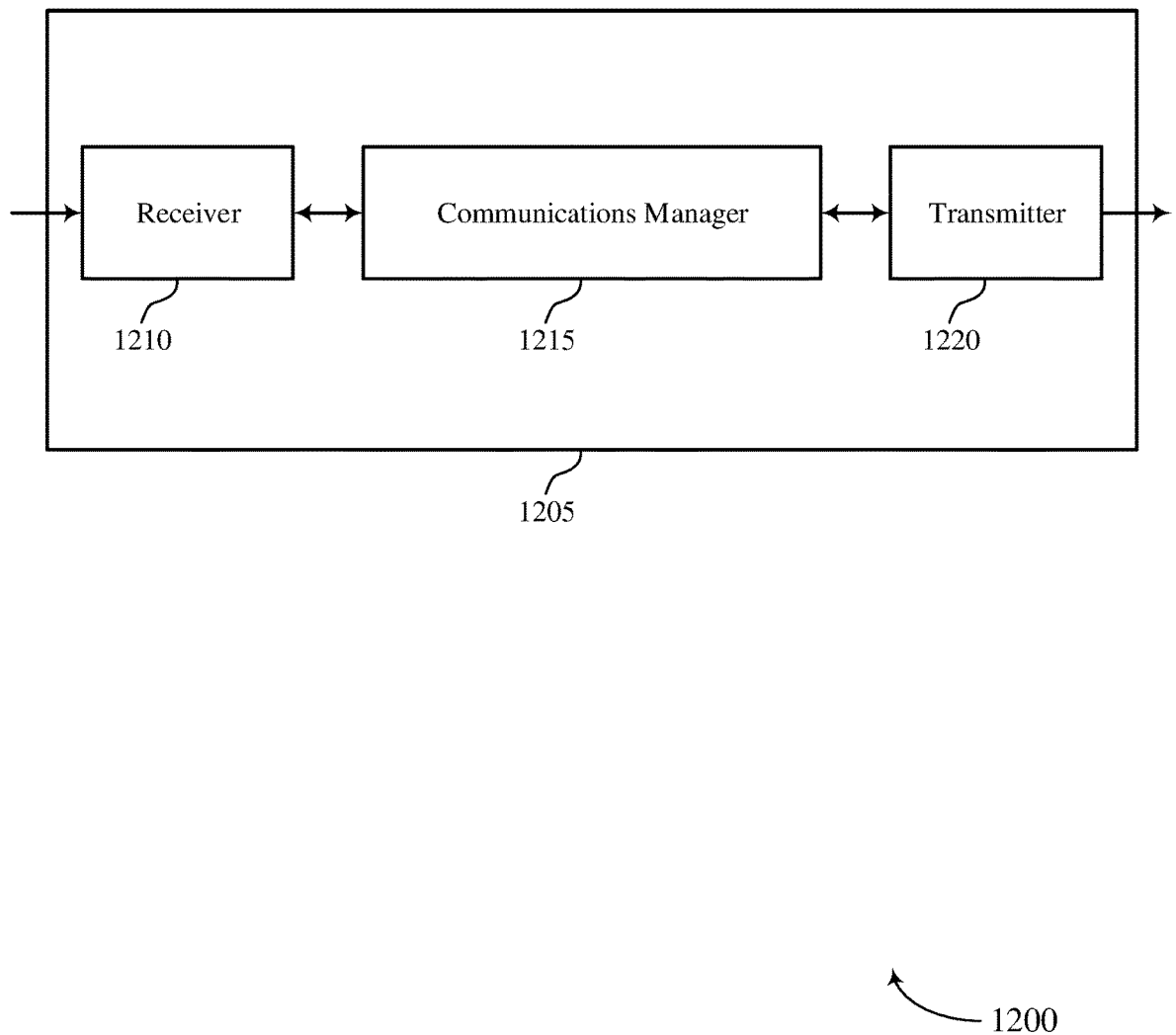
FIGS. 12 and 13 show block diagrams of devices that support reciprocity-based beamforming for architecture-aware UEs in accordance with aspects of the present disclosure.

FIG. 12 shows a block diagram 1200 of a device 1205 that supports reciprocity-based beamforming for architecture-aware UEs in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to reciprocity-based beamforming for architecture-aware UEs, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may receive, from a UE, a UE capability message including an indication of at least one of a first demodulation mode supported by the UE or a second demodulation mode supported by the UE, the first demodulation mode corresponding to a demodulation procedure associated with a set of antenna ports at the UE and the second demodulation mode corresponding to a set of demodulation procedures, each of the set of demodulation procedures associated with a respective subset of the set of antenna ports at the UE. The communications manager 1215 may precode one or more downlink signals based on the indication of at least one of the first demodulation mode or the second demodulation mode and may transmit the one or more downlink signals to the UE based on the indication of at least one of the first demodulation mode or the second demodulation mode. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
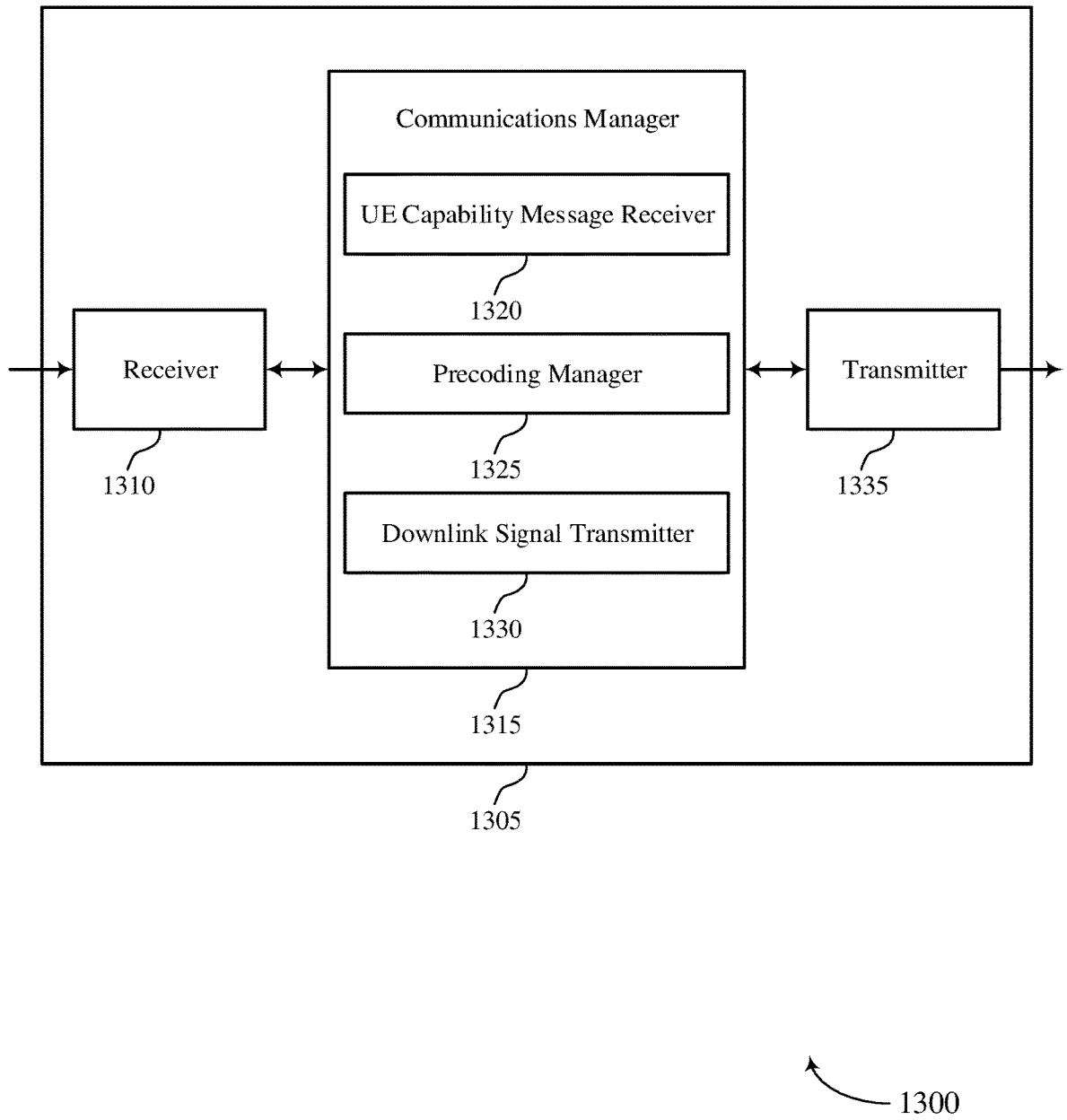

FIG. 13 shows a block diagram 1300 of a device 1305 that supports reciprocity-based beamforming for architecture-aware UEs in accordance with aspects of the present disclosure. The device 1305 may be an example of aspects of a device 1205 or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to reciprocity-based beamforming for architecture-aware UEs, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a UE capability message receiver 1320, a precoding manager 1325, and a downlink signal transmitter 1330. The communications manager 1315 may be an example of aspects of the communications manager 1510 described herein.

The UE capability message receiver 1320 may receive, from a UE, a UE capability message including an indication of at least one of a first demodulation mode supported by the UE or a second demodulation mode supported by the UE, the first demodulation mode corresponding to a demodulation procedure associated with a set of antenna ports at the UE and the second demodulation mode corresponding to a set of demodulation procedures, each of the set of demodulation procedures associated with a respective subset of the set of antenna ports at the UE.

The precoding manager 1325 may precode one or more downlink signals based on the indication of at least one of the first demodulation mode or the second demodulation mode. The downlink signal transmitter 1330 may transmit the one or more downlink signals to the UE based on the indication of at least one of the first demodulation mode or the second demodulation mode.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
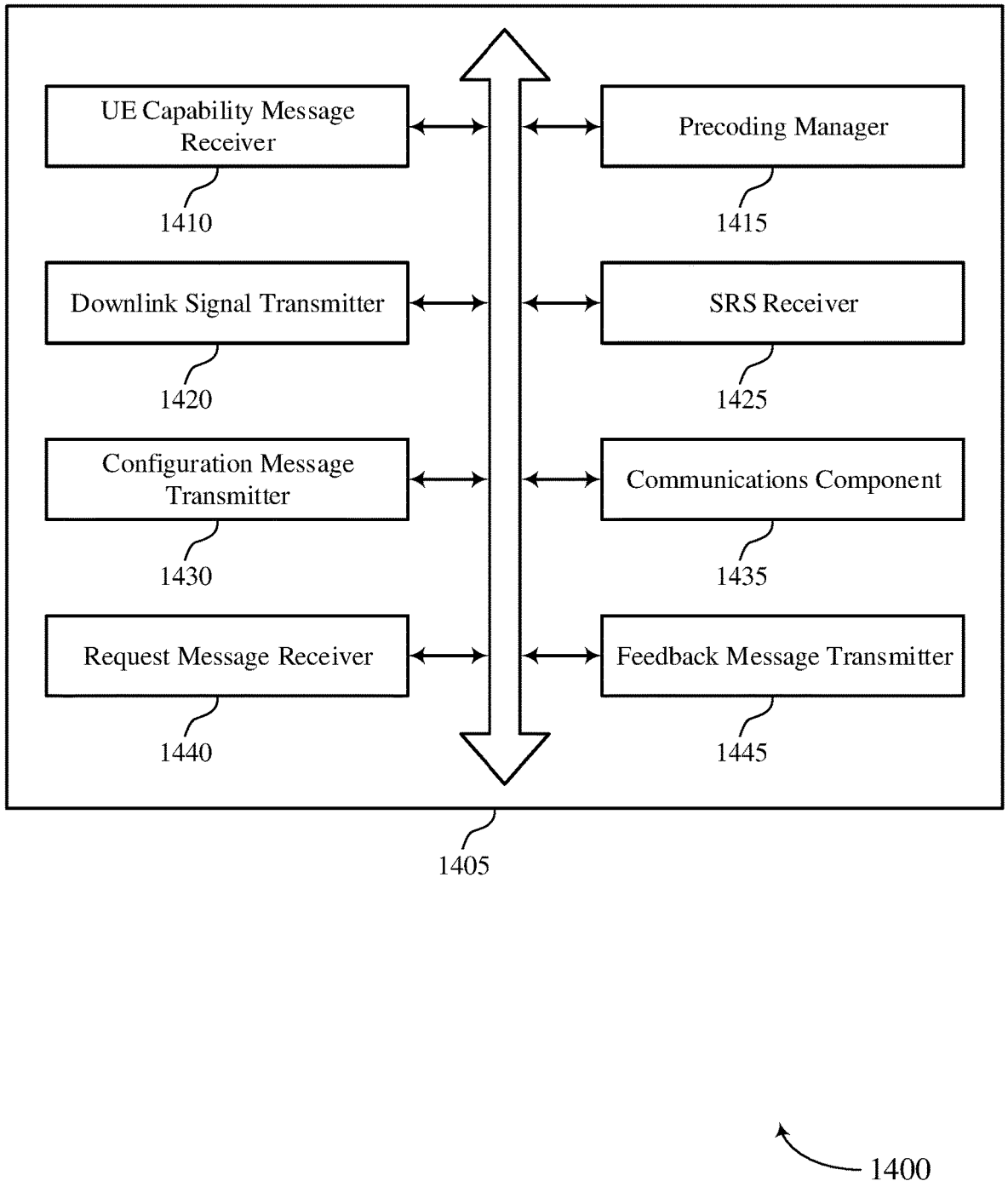
FIG. 14 shows a block diagram of a communications manager that supports reciprocity-based beamforming for architecture-aware UEs in accordance with aspects of the present disclosure.

FIG. 14 shows a block diagram 1400 of a communications manager 1405 that supports reciprocity-based beamforming for architecture-aware UEs in accordance with aspects of the present disclosure. The communications manager 1405 may be an example of aspects of a communications manager 1215, a communications manager 1315, or a communications manager 1510 described herein. The communications manager 1405 may include a UE capability message receiver 1410, a precoding manager 1415, a downlink signal transmitter 1420, an SRS receiver 1425, a configuration message transmitter 1430, a communications component 1435, a request message receiver 1440, and a feedback message transmitter 1445. Each of these modules may communicate, directly or indirectly, with one another (e.g., via one or more buses).

The UE capability message receiver 1410 may receive, from a UE, a UE capability message including an indication of at least one of a first demodulation mode supported by the UE or a second demodulation mode supported by the UE, the first demodulation mode corresponding to a demodulation procedure associated with a set of antenna ports at the UE and the second demodulation mode corresponding to a set of demodulation procedures, each of the set of demodulation procedures associated with a respective subset of the set of antenna ports at the UE.

The precoding manager 1415 may precode one or more downlink signals based on the indication of at least one of the first demodulation mode or the second demodulation mode. In some examples, the precoding manager 1415 may precode the single downlink signal with a single precoder corresponding to the single downlink beam. In some examples, the precoding manager 1415 may precode the first downlink signal with a first precoder corresponding to the first downlink beam. In some examples, the precoding manager 1415 may precode the second downlink signal with a second precoder different from the first precoder and corresponding to the second downlink beam.

The downlink signal transmitter 1420 may transmit the one or more downlink signals to the UE based on the indication of at least one of the first demodulation mode or the second demodulation mode. In some examples, the downlink signal transmitter 1420 may transmit, to the set of antenna ports, a single downlink signal via a single downlink beam based on the first demodulation mode. In some examples, the downlink signal transmitter 1420 may transmit, to a first subset of antenna ports of the set of antenna ports, a first downlink signal via a first downlink beam. In some examples, the downlink signal transmitter 1420 may transmit, to a second subset of antenna ports of the set of antenna ports different from the first subset of antenna ports, a second downlink signal via a second downlink beam different from the first downlink beam, where the first downlink signal and the second downlink signal are transmitted based on the second demodulation mode.

The SRS receiver 1425 may receive, from the UE, a set of SRSs based on the indication of at least one of the first demodulation mode or the second demodulation mode, where each SRS corresponds to a respective antenna port of the set of antenna ports at the UE. In some examples, the SRS receiver 1425 may receive a first subset of SRSs of the set of SRSs from a first subset of antenna ports of the set of antenna ports based on the second demodulation mode. In some examples, the SRS receiver 1425 may receive a second subset of SRSs of the set of SRSs different from the first subset of SRSs from a second subset of antenna ports of the set of antenna ports different from the first subset of antenna ports based on the second demodulation mode. In some examples, the SRS receiver 1425 may receive the first subset of SRSs via a first set of consecutive SRS resources of the SRS resource set and receiving the second subset of SRSs via a second set of consecutive SRS resources of the SRS resource set. In some examples, the SRS receiver 1425 may receive the first subset of SRSs and the second subset of SRSs via interleaved SRS resources of the SRS resource set.

In some cases, the SRS resource set configuration includes a SRS resource set. In some cases, the first subset of SRSs and the second subset of SRSs are received in the SRS resource set based on the configuration message. In some cases, the SRS resource set configuration includes a first SRS resource set and a second SRS resource set. In some cases, the first subset of SRSs is received in the first SRS resource set. In some cases, the second subset of SRSs is received in the second SRS resource set. In some cases, the first subset of antenna ports corresponds to a first panel associated with the first SRS resource set and the second subset of antenna ports corresponds to a second panel different from the first panel and associated with the second SRS resource set.

The configuration message transmitter 1430 may transmit a configuration message including an indication of a SRS resource set configuration for the UE to transmit the set of SRSs. In some examples, the configuration message transmitter 1430 may transmit, to the UE, a configuration message including at least one of an indication for the UE to transition from the first demodulation mode to the second demodulation mode or an indication for the UE to transition from the second demodulation mode to the first demodulation mode.

In some cases, the indication of at least one of the first demodulation mode or the second demodulation mode indicates a flexible switching mode between the first demodulation mode and the second demodulation mode. In some cases, the indication of at least one of the first demodulation mode or the second demodulation mode includes a bit field in the UE capability message indicating at least one of the first demodulation mode, the second demodulation mode, or a flexible switching mode between the first demodulation mode and the second demodulation mode. In some cases, the UE capability message includes an indication of a preferred precoder type, the indication of the preferred precoder type including the indication of at least one of the first demodulation mode or the second demodulation mode. In some cases, the first demodulation mode is configured for the UE to demodulate eight or fewer downlink layers and the second demodulation mode is configured for the UE to demodulate four or fewer downlink layers.

The request message receiver 1440 may receive, from the UE, a request message including at least one of a request to transition from the first demodulation mode to the second demodulation mode or a request to transition from the second demodulation mode to the first demodulation mode, where receiving the request message is based on the flexible switching mode between the first demodulation mode and the second demodulation mode. The feedback message transmitter 1445 may transmit, to the UE and in response to the request message, a feedback message including at least one of an acknowledgement for the UE to transition from the first demodulation mode to the second demodulation mode or an acknowledgement for the UE to transition from the second demodulation mode to the first demodulation mode.

Figure 15:
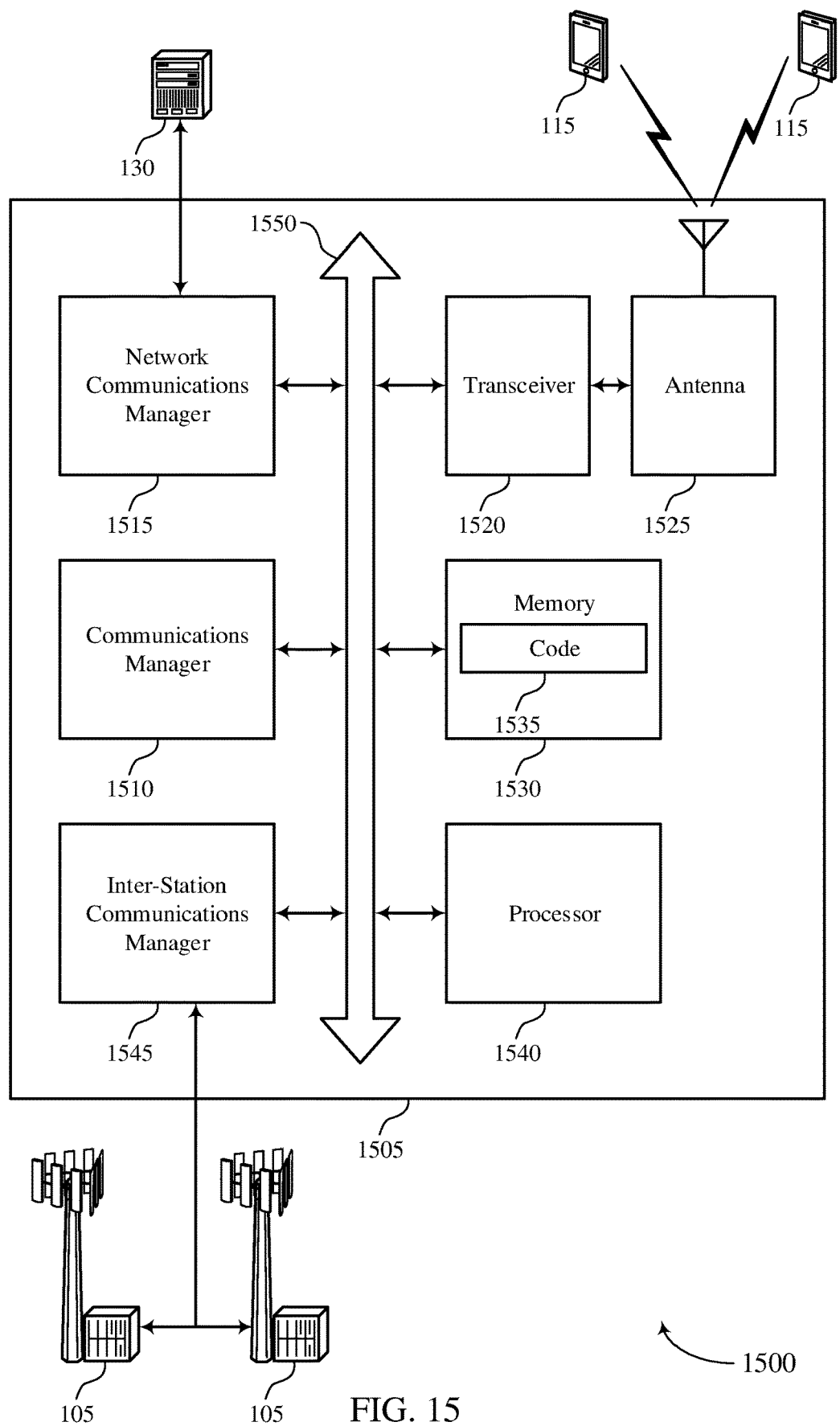
FIG. 15 shows a diagram of a system including a device that supports reciprocity-based beamforming for architecture-aware UEs in accordance with aspects of the present disclosure.

FIG. 15 shows a diagram of a system 1500 including a device 1505 that supports reciprocity-based beamforming for architecture-aware UEs in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may receive, from a UE, a UE capability message including an indication of at least one of a first demodulation mode supported by the UE or a second demodulation mode supported by the UE, the first demodulation mode corresponding to a demodulation procedure associated with a set of antenna ports at the UE and the second demodulation mode corresponding to a set of demodulation procedures, each of the set of demodulation procedures associated with a respective subset of the set of antenna ports at the UE, precode one or more downlink signals based on the indication of at least one of the first demodulation mode or the second demodulation mode, and transmit the one or more downlink signals to the UE based on the indication of at least one of the first demodulation mode or the second demodulation mode.

The network communications manager 1515 may manage communications with the core network 130 (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting reciprocity-based beamforming for architecture-aware UEs).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
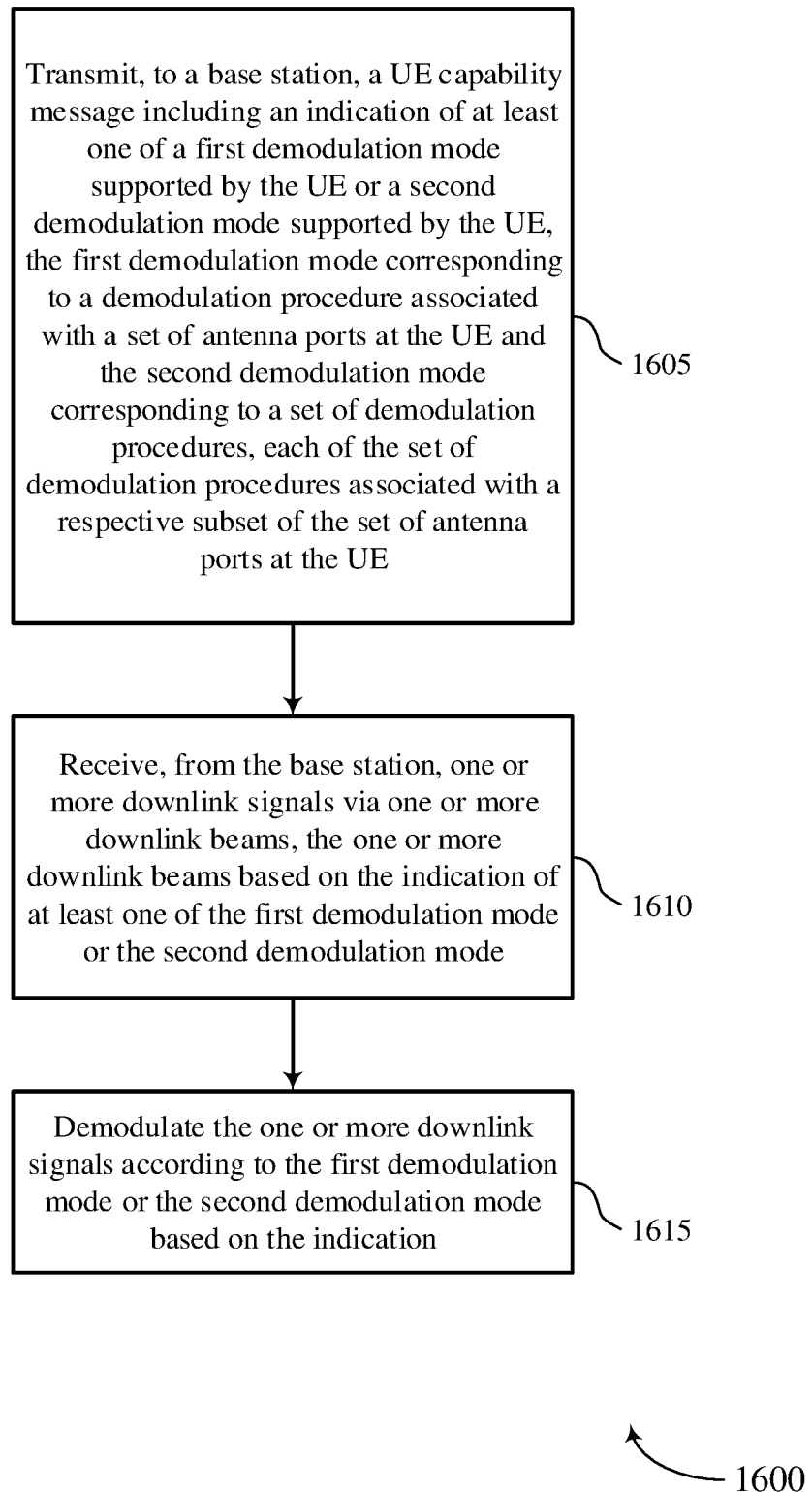
FIGS. 16 through 20 show flowcharts illustrating methods that support reciprocity-based beamforming for architecture-aware UEs in accordance with aspects of the present disclosure.

FIG. 16 shows a flowchart illustrating a method 1600 that supports reciprocity-based beamforming for architecture-aware UEs in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may transmit, to a base station, a UE capability message including an indication of at least one of a first demodulation mode supported by the UE or a second demodulation mode supported by the UE, the first demodulation mode corresponding to a demodulation procedure associated with a set of antenna ports at the UE and the second demodulation mode corresponding to a set of demodulation procedures, each of the set of demodulation procedures associated with a respective subset of the set of antenna ports at the UE. The operations of 1605 may be performed according to the methods described herein. In some examples, aspects of the operations of 1605 may be performed by a UE capability message transmitter as described with reference to FIGS. 8 through 11.

At 1610, the UE may receive, from the base station, one or more downlink signals via one or more downlink beams, the one or more downlink beams based on the indication of at least one of the first demodulation mode or the second demodulation mode. The operations of 1610 may be performed according to the methods described herein. In some examples, aspects of the operations of 1610 may be performed by a downlink signal receiver as described with reference to FIGS. 8 through 11.

At 1615, the UE may demodulate the one or more downlink signals according to the first demodulation mode or the second demodulation mode based on the indication. The operations of 1615 may be performed according to the methods described herein. In some examples, aspects of the operations of 1615 may be performed by a demodulation manager as described with reference to FIGS. 8 through 11.

Figure 17:
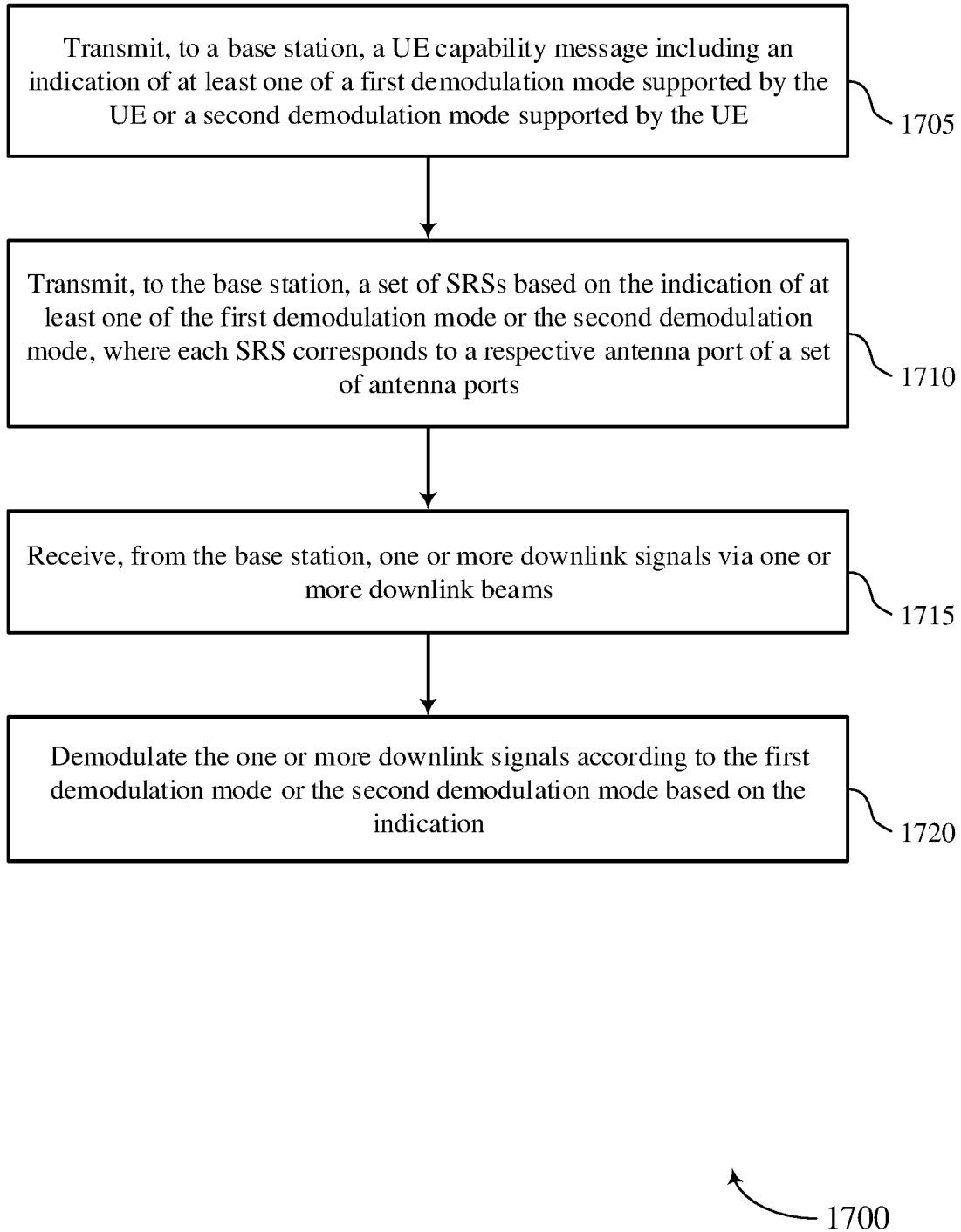

FIG. 17 shows a flowchart illustrating a method 1700 that supports reciprocity-based beamforming for architecture-aware UEs in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may transmit, to a base station, a UE capability message including an indication of at least one of a first demodulation mode supported by the UE or a second demodulation mode supported by the UE, the first demodulation mode corresponding to a demodulation procedure associated with a set of antenna ports at the UE and the second demodulation mode corresponding to a set of demodulation procedures, each of the set of demodulation procedures associated with a respective subset of the set of antenna ports at the UE. The operations of 1705 may be performed according to the methods described herein. In some examples, aspects of the operations of 1705 may be performed by a UE capability message transmitter as described with reference to FIGS. 8 through 11.

At 1710, the UE may transmit, to the base station, a set of SRSs based on the indication of at least one of the first demodulation mode or the second demodulation mode, where each SRS corresponds to a respective antenna port of the set of antenna ports. The operations of 1710 may be performed according to the methods described herein. In some examples, aspects of the operations of 1710 may be performed by an SRS transmitter as described with reference to FIGS. 8 through 11.

At 1715, the UE may receive, from the base station, one or more downlink signals via one or more downlink beams, the one or more downlink beams based on the indication of at least one of the first demodulation mode or the second demodulation mode. The downlink signal(s), downlink beam(s), or both may further be based on the SRSs. The operations of 1715 may be performed according to the methods described herein. In some examples, aspects of the operations of 1715 may be performed by a downlink signal receiver as described with reference to FIGS. 8 through 11.

At 1720, the UE may demodulate the one or more downlink signals according to the first demodulation mode or the second demodulation mode based on the indication. The operations of 1720 may be performed according to the methods described herein. In some examples, aspects of the operations of 1720 may be performed by a demodulation manager as described with reference to FIGS. 8 through 11.

Figure 18:
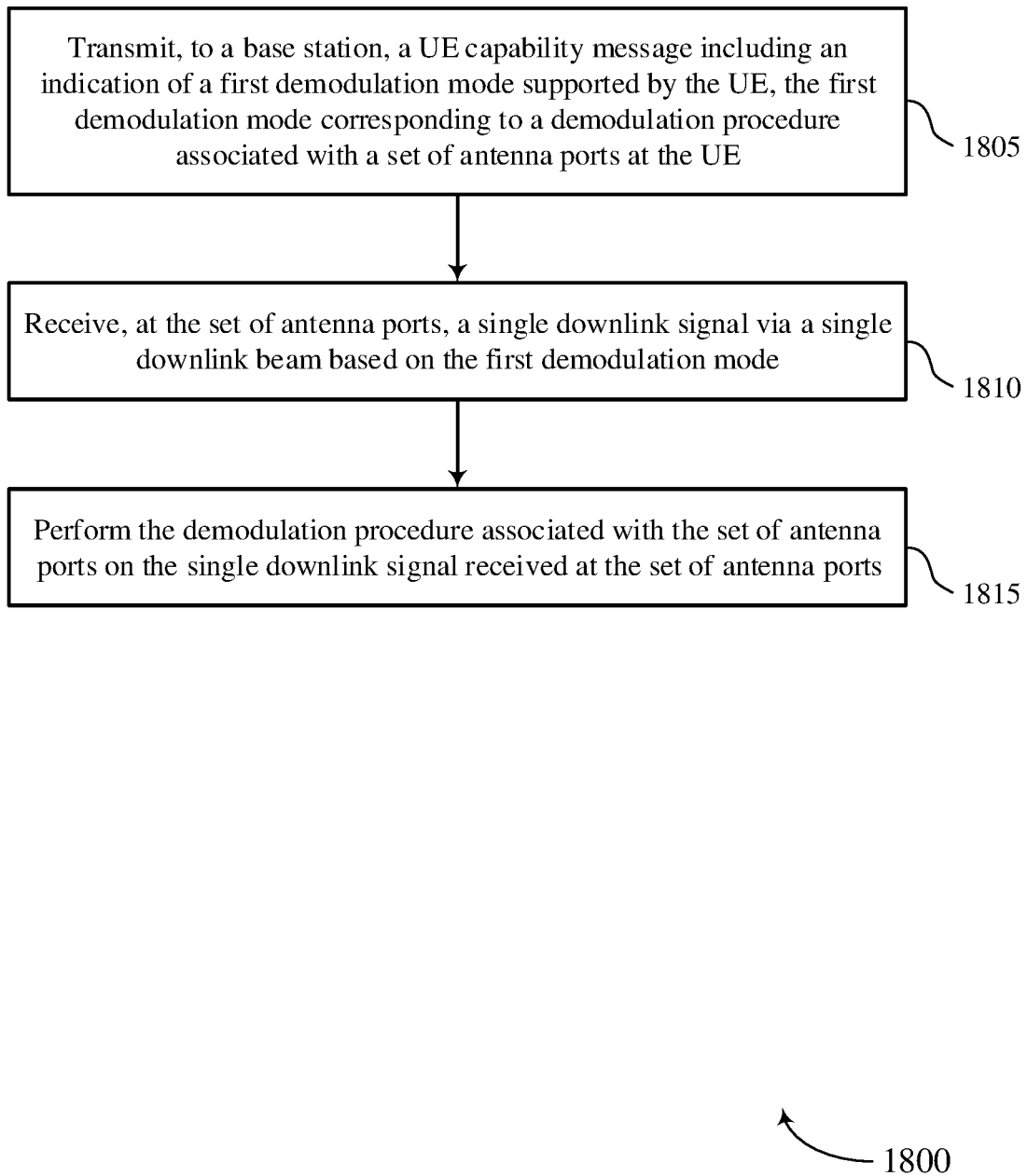

FIG. 18 shows a flowchart illustrating a method 1800 that supports reciprocity-based beamforming for architecture-aware UEs in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may transmit, to a base station, a UE capability message including an indication of at least one of a first demodulation mode supported by the UE or a second demodulation mode supported by the UE, the first demodulation mode corresponding to a demodulation procedure associated with a set of antenna ports at the UE and the second demodulation mode corresponding to a set of demodulation procedures, each of the set of demodulation procedures associated with a respective subset of the set of antenna ports at the UE. For example, the UE capability message may indicate the first demodulation mode. The operations of 1805 may be performed according to the methods described herein. In some examples, aspects of the operations of 1805 may be performed by a UE capability message transmitter as described with reference to FIGS. 8 through 11.

At 1810, the UE may receive, at the set of antenna ports, a single downlink signal via a single downlink beam based on the first demodulation mode. The operations of 1810 may be performed according to the methods described herein. In some examples, aspects of the operations of 1810 may be performed by a downlink signal receiver as described with reference to FIGS. 8 through 11.

At 1815, the UE may perform the demodulation procedure associated with the set of antenna ports on the single downlink signal received at the set of antenna ports. The operations of 1815 may be performed according to the methods described herein. In some examples, aspects of the operations of 1815 may be performed by a demodulation manager as described with reference to FIGS. 8 through 11.

Figure 19:
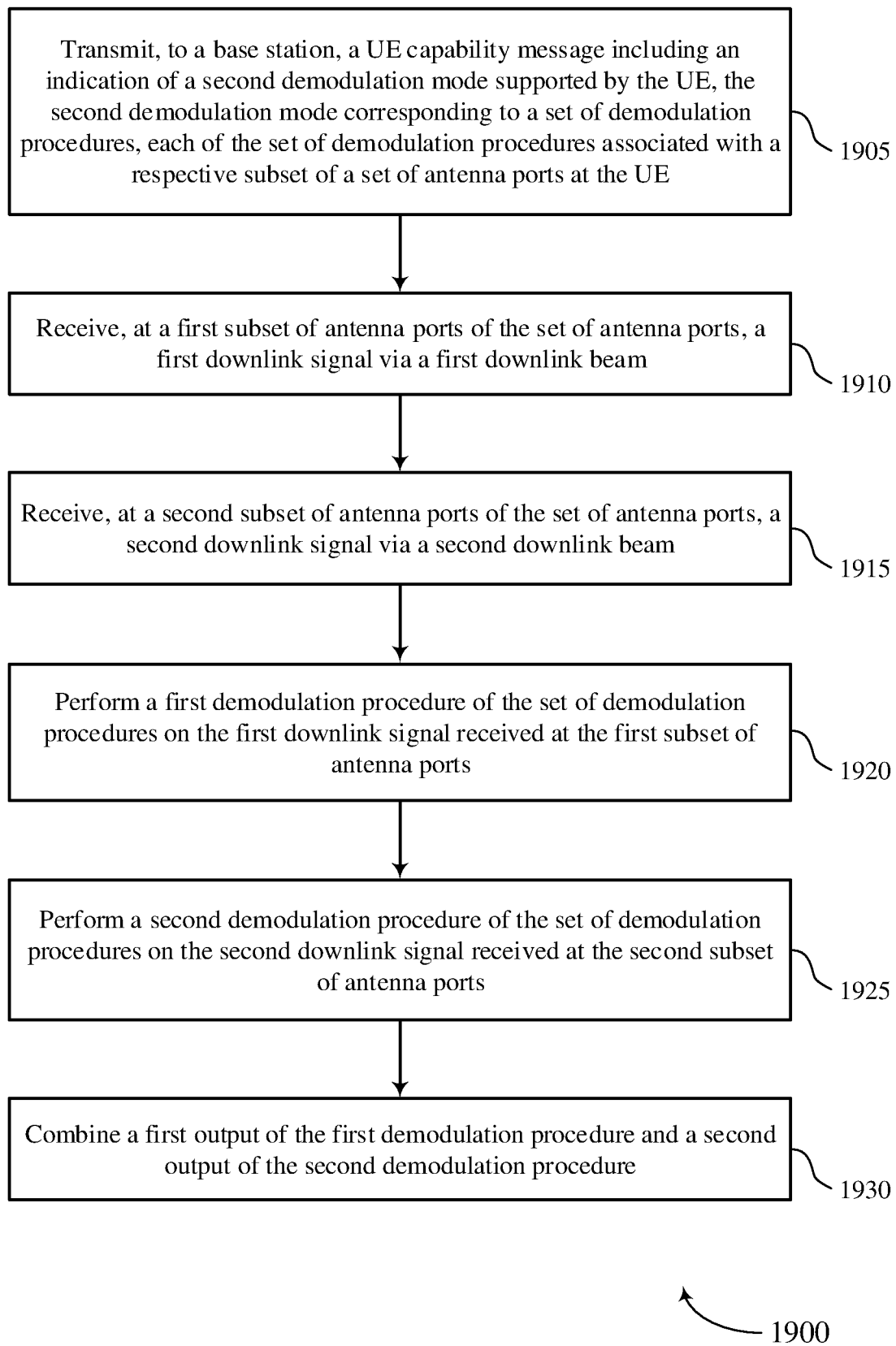

FIG. 19 shows a flowchart illustrating a method 1900 that supports reciprocity-based beamforming for architecture-aware UEs in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1905, the UE may transmit, to a base station, a UE capability message including an indication of at least one of a first demodulation mode supported by the UE or a second demodulation mode supported by the UE, the first demodulation mode corresponding to a demodulation procedure associated with a set of antenna ports at the UE and the second demodulation mode corresponding to a set of demodulation procedures, each of the set of demodulation procedures associated with a respective subset of the set of antenna ports at the UE. For example, the UE capability message may indicate the second demodulation mode. The operations of 1905 may be performed according to the methods described herein. In some examples, aspects of the operations of 1905 may be performed by a UE capability message transmitter as described with reference to FIGS. 8 through 11.

At 1910, the UE may receive, at a first subset of antenna ports of the set of antenna ports, a first downlink signal via a first downlink beam. The operations of 1910 may be performed according to the methods described herein. In some examples, aspects of the operations of 1910 may be performed by a downlink signal receiver as described with reference to FIGS. 8 through 11.

At 1915, the UE may receive, at a second subset of antenna ports of the set of antenna ports different from the first subset of antenna ports, a second downlink signal via a second downlink beam, where the first downlink signal and the second downlink signal are received based on the second demodulation mode. The operations of 1915 may be performed according to the methods described herein. In some examples, aspects of the operations of 1915 may be performed by a downlink signal receiver as described with reference to FIGS. 8 through 11.

At 1920, the UE may perform a first demodulation procedure of the set of demodulation procedures on the first downlink signal received at the first subset of antenna ports. The operations of 1920 may be performed according to the methods described herein. In some examples, aspects of the operations of 1920 may be performed by a demodulation manager as described with reference to FIGS. 8 through 11.

At 1925, the UE may perform a second demodulation procedure of the set of demodulation procedures on the second downlink signal received at the second subset of antenna ports. The operations of 1925 may be performed according to the methods described herein. In some examples, aspects of the operations of 1925 may be performed by a demodulation manager as described with reference to FIGS. 8 through 11.

At 1930, the UE may combine a first output of the first demodulation procedure and a second output of the second demodulation procedure. The operations of 1930 may be performed according to the methods described herein. In some examples, aspects of the operations of 1930 may be performed by a demodulation manager as described with reference to FIGS. 8 through 11.

Figure 20:
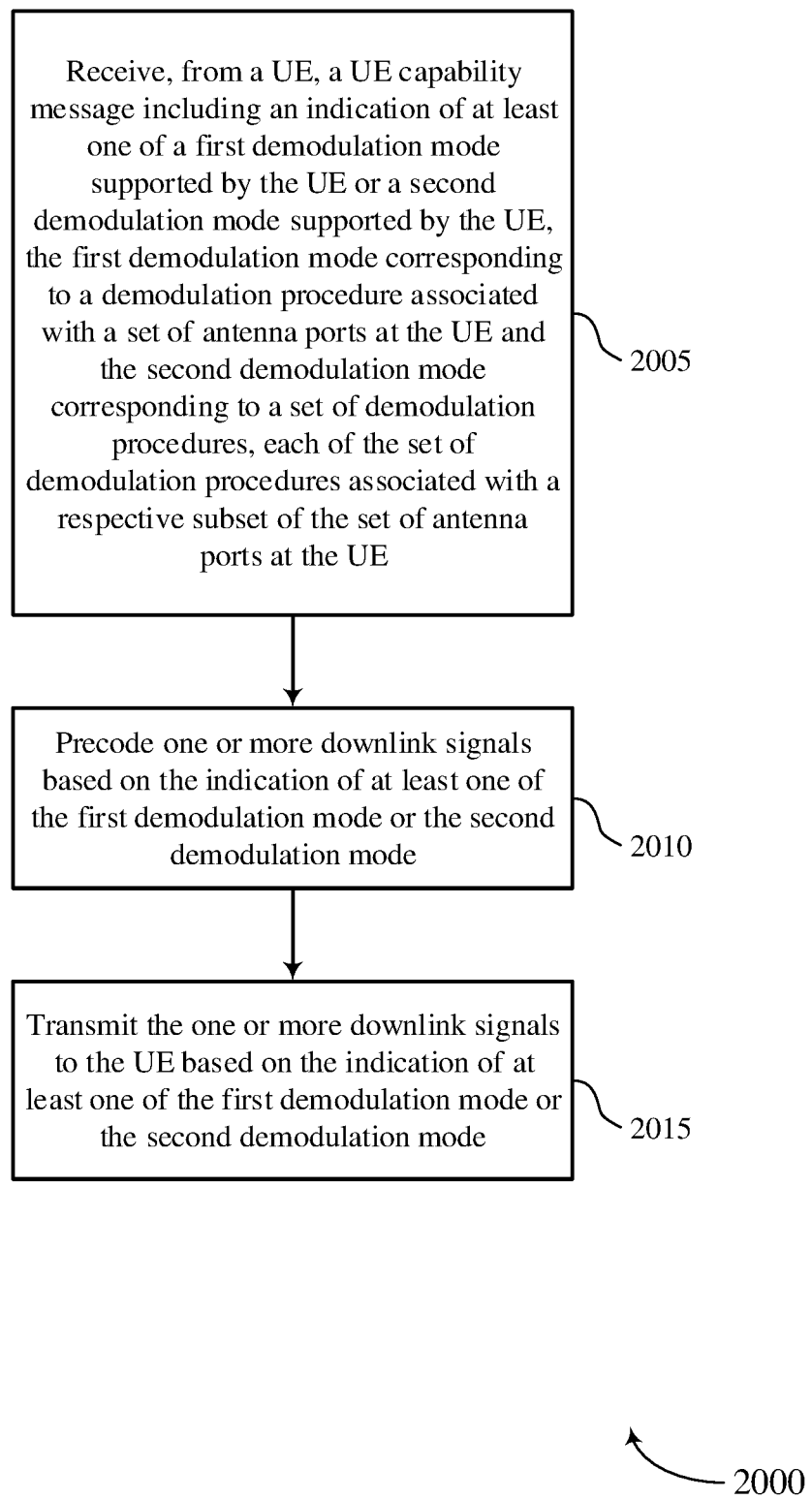

FIG. 20 shows a flowchart illustrating a method 2000 that supports reciprocity-based beamforming for architecture-aware UEs in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may receive, from a UE, a UE capability message including an indication of at least one of a first demodulation mode supported by the UE or a second demodulation mode supported by the UE, the first demodulation mode corresponding to a demodulation procedure associated with a set of antenna ports at the UE and the second demodulation mode corresponding to a set of demodulation procedures, each of the set of demodulation procedures associated with a respective subset of the set of antenna ports at the UE. The operations of 2005 may be performed according to the methods described herein. In some examples, aspects of the operations of 2005 may be performed by a UE capability message receiver as described with reference to FIGS. 12 through 15.

At 2010, the base station may precode one or more downlink signals based on the indication of at least one of the first demodulation mode or the second demodulation mode. The operations of 2010 may be performed according to the methods described herein. In some examples, aspects of the operations of 2010 may be performed by a precoding manager as described with reference to FIGS. 12 through 15.

At 2015, the base station may transmit the one or more downlink signals to the UE based on the indication of at least one of the first demodulation mode or the second demodulation mode. The operations of 2015 may be performed according to the methods described herein. In some examples, aspects of the operations of 2015 may be performed by a downlink signal transmitter as described with reference to FIGS. 12 through 15.

It should be noted that the methods described herein describe possible implementations, and that the operations may be rearranged or otherwise modified and that other implementations are possible. Further, aspects from two or more of the methods may be combined.

The following examples are given by way of illustration. Aspects of the following examples may be combined with aspects shown or discussed in relation to the figures or elsewhere herein.

Example 1: A method for wireless communications at a UE, comprising: transmitting, to a base station, a UE capability message comprising an indication of at least one of a first demodulation mode supported by the UE or a second demodulation mode supported by the UE, the first demodulation mode corresponding to a demodulation procedure associated with a plurality of antenna ports at the UE and the second demodulation mode corresponding to a plurality of demodulation procedures, each of the plurality of demodulation procedures associated with a respective subset of the plurality of antenna ports at the UE; receiving, from the base station, one or more downlink signals via one or more downlink beams, the one or more downlink beams based at least in part on the indication of at least one of the first demodulation mode or the second demodulation mode; and demodulating the one or more downlink signals according to the first demodulation mode or the second demodulation mode based at least in part on the indication.

Example 2: The method of example 1, further comprising: transmitting, to the base station, a plurality of sounding reference signals based at least in part on the indication of at least one of the first demodulation mode or the second demodulation mode, wherein each sounding reference signal corresponds to a respective antenna port of the plurality of antenna ports.

Example 3: The method of example 2, wherein the indication of at least one of the first demodulation mode or the second demodulation mode indicates the second demodulation mode and wherein transmitting the plurality of sounding reference signals comprises: transmitting a first subset of sounding reference signals of the plurality of sounding reference signals to the base station via a first subset of antenna ports of the plurality of antenna ports based at least in part on the second demodulation mode; and transmitting a second subset of sounding reference signals of the plurality of sounding reference signals different from the first subset of sounding reference signals to the base station via a second subset of antenna ports of the plurality of antenna ports different from the first subset of antenna ports based at least in part on the second demodulation mode.

Example 4: The method of either of examples 2 or 3, further comprising: receiving a configuration message comprising an indication of a sounding reference signal resource set configuration for transmitting the plurality of sounding reference signals.

Example 5: The method of example 4, wherein: the sounding reference signal resource set configuration comprises a sounding reference signal resource set; and the first subset of sounding reference signals and the second subset of sounding reference signals are transmitted in the sounding reference signal resource set based at least in part on the configuration message.

Example 6: The method of example 5, wherein transmitting the first subset of sounding reference signals and the second subset of sounding reference signals comprises at least one of: transmitting the first subset of sounding reference signals via a first set of consecutive sounding reference signal resources of the sounding reference signal resource set and transmitting the second subset of sounding reference signals via a second set of consecutive sounding reference signal resources of the sounding reference signal resource set; or transmitting the first subset of sounding reference signals and the second subset of sounding reference signals via interleaved sounding reference signal resources of the sounding reference signal resource set.

Example 7: The method of example 4, wherein: the sounding reference signal resource set configuration comprises a first sounding reference signal resource set and a second sounding reference signal resource set; the first subset of sounding reference signals is transmitted in the first sounding reference signal resource set; and the second subset of sounding reference signals is transmitted in the second sounding reference signal resource set.

Example 8: The method of example 7, wherein the first subset of antenna ports corresponds to a first panel associated with the first sounding reference signal resource set and the second subset of antenna ports corresponds to a second panel different from the first panel and associated with the second sounding reference signal resource set.

Example 9: The method of any of examples 1 through 8, wherein the indication of at least one of the first demodulation mode or the second demodulation mode indicates a flexible switching mode between the first demodulation mode and the second demodulation mode.

Example 10: The method of example 9, further comprising: transmitting, to the base station, a request message comprising at least one of a request to transition from the first demodulation mode to the second demodulation mode or a request to transition from the second demodulation mode to the first demodulation mode, wherein transmitting the request message is based at least in part on the flexible switching mode between the first demodulation mode and the second demodulation mode.

Example 11: The method of example 10, further comprising: receiving, from the base station and in response to the request message, a feedback message comprising at least one of an acknowledgement for the UE to transition from the first demodulation mode to the second demodulation mode or an acknowledgement for the UE to transition from the second demodulation mode to the first demodulation mode.

Example 12: The method of any of examples 9 through 11, further comprising: receiving, from the base station, a configuration message comprising at least one of an indication for the UE to transition from the first demodulation mode to the second demodulation mode or an indication for the UE to transition from the second demodulation mode to the first demodulation mode.

Example 13: The method of any of examples 1 through 12, wherein the indication of at least one of the first demodulation mode or the second demodulation mode indicates the first demodulation mode and receiving the one or more downlink signals comprises: receiving, at the plurality of antenna ports, a single downlink signal via a single downlink beam based at least in part on the first demodulation mode.

Example 14: The method of example 13, wherein demodulating the one or more downlink signals comprises: performing the demodulation procedure associated with the plurality of antenna ports on the single downlink signal received at the plurality of antenna ports.

Example 15: The method of either of examples 13 or 14, wherein the single downlink signal is associated with a single precoder at the base station.

Example 16: The method of any of examples 1 through 12, wherein the indication of at least one of the first demodulation mode or the second demodulation mode indicates the second demodulation mode and receiving the one or more downlink signals comprises: receiving, at a first subset of antenna ports of the plurality of antenna ports, a first downlink signal via a first downlink beam; and receiving, at a second subset of antenna ports of the plurality of antenna ports different from the first subset of antenna ports, a second downlink signal via a second downlink beam, wherein the first downlink signal and the second downlink signal are received based at least in part on the second demodulation mode.

Example 17: The method of example 16, wherein demodulating the one or more downlink signals comprises: performing a first demodulation procedure of the plurality of demodulation procedures on the first downlink signal received at the first subset of antenna ports; and performing a second demodulation procedure of the plurality of demodulation procedures on the second downlink signal received at the second subset of antenna ports.

Example 18: The method of example 17, wherein demodulating the one or more downlink signals further comprises: combining a first output of the first demodulation procedure and a second output of the second demodulation procedure.

Example 19: The method of example 18, wherein combining the first output of the first demodulation procedure and the second output of the second demodulation procedure comprises: combining a first log-likelihood ratio value output from the first demodulation procedure and a second log-likelihood ratio value output from the second demodulation procedure.

Example 20: The method of any of examples 16 through 19, wherein the first downlink signal is associated with a first precoder at the base station and the second downlink signal is associated with a second precoder at the base station different from the first precoder.

Example 21: The method of any of examples 1 through 20, wherein the indication of at least one of the first demodulation mode or the second demodulation mode comprises a bit field in the UE capability message indicating at least one of the first demodulation mode, the second demodulation mode, or a flexible switching mode between the first demodulation mode and the second demodulation mode.

Example 22: The method of any of examples 1 through 21, wherein the UE capability message comprises an indication of a preferred precoder type, the indication of the preferred precoder type comprising the indication of at least one of the first demodulation mode or the second demodulation mode.

Example 23: The method of any of examples 1 through 22, wherein the first demodulation mode is configured to demodulate eight or fewer downlink layers and the second demodulation mode is configured to demodulate four or fewer downlink layers.

Example 24: A method for wireless communications at a base station, comprising: receiving, from a UE, a UE capability message comprising an indication of at least one of a first demodulation mode supported by the UE or a second demodulation mode supported by the UE, the first demodulation mode corresponding to a demodulation procedure associated with a plurality of antenna ports at the UE and the second demodulation mode corresponding to a plurality of demodulation procedures, each of the plurality of demodulation procedures associated with a respective subset of the plurality of antenna ports at the UE; precoding one or more downlink signals based at least in part on the indication of at least one of the first demodulation mode or the second demodulation mode; and transmitting the one or more downlink signals to the UE based at least in part on the indication of at least one of the first demodulation mode or the second demodulation mode.

Example 25: The method of example 24, further comprising: receiving, from the UE, a plurality of sounding reference signals based at least in part on the indication of at least one of the first demodulation mode or the second demodulation mode, wherein each sounding reference signal corresponds to a respective antenna port of the plurality of antenna ports at the UE.

Example 26: The method of example 25, wherein the indication of at least one of the first demodulation mode or the second demodulation mode indicates the second demodulation mode and wherein receiving the plurality of sounding reference signals comprises: receiving a first subset of sounding reference signals of the plurality of sounding reference signals from a first subset of antenna ports of the plurality of antenna ports based at least in part on the second demodulation mode; and receiving a second subset of sounding reference signals of the plurality of sounding reference signals different from the first subset of sounding reference signals from a second subset of antenna ports of the plurality of antenna ports different from the first subset of antenna ports based at least in part on the second demodulation mode.

Example 27: The method of either of examples 25 or 26, further comprising: transmitting a configuration message comprising an indication of a sounding reference signal resource set configuration for the UE to transmit the plurality of sounding reference signals.

Example 28: The method of example 27, wherein: the sounding reference signal resource set configuration comprises a sounding reference signal resource set; and the first subset of sounding reference signals and the second subset of sounding reference signals are received in the sounding reference signal resource set based at least in part on the configuration message.

Example 29: The method of example 28, wherein receiving the first subset of sounding reference signals and the second subset of sounding reference signals comprises at least one of: receiving the first subset of sounding reference signals via a first set of consecutive sounding reference signal resources of the sounding reference signal resource set and receiving the second subset of sounding reference signals via a second set of consecutive sounding reference signal resources of the sounding reference signal resource set; or receiving the first subset of sounding reference signals and the second subset of sounding reference signals via interleaved sounding reference signal resources of the sounding reference signal resource set.

Example 30: The method of example 27, wherein: the sounding reference signal resource set configuration comprises a first sounding reference signal resource set and a second sounding reference signal resource set; the first subset of sounding reference signals is received in the first sounding reference signal resource set; and the second subset of sounding reference signals is received in the second sounding reference signal resource set.

Example 31: The method of example 30, wherein the first subset of antenna ports corresponds to a first panel associated with the first sounding reference signal resource set and the second subset of antenna ports corresponds to a second panel different from the first panel and associated with the second sounding reference signal resource set.

Example 32: The method of any of examples 24 through 31, wherein the indication of at least one of the first demodulation mode or the second demodulation mode indicates a flexible switching mode between the first demodulation mode and the second demodulation mode.

Example 33: The method of example 32, further comprising: receiving, from the UE, a request message comprising at least one of a request to transition from the first demodulation mode to the second demodulation mode or a request to transition from the second demodulation mode to the first demodulation mode, wherein receiving the request message is based at least in part on the flexible switching mode between the first demodulation mode and the second demodulation mode.

Example 34: The method of example 33, further comprising: transmitting, to the UE and in response to the request message, a feedback message comprising at least one of an acknowledgement for the UE to transition from the first demodulation mode to the second demodulation mode or an acknowledgement for the UE to transition from the second demodulation mode to the first demodulation mode.

Example 35: The method of any of examples 32 through 34, further comprising: transmitting, to the UE, a configuration message comprising at least one of an indication for the UE to transition from the first demodulation mode to the second demodulation mode or an indication for the UE to transition from the second demodulation mode to the first demodulation mode.

Example 36: The method of any of examples 24 through 35, wherein the indication of at least one of the first demodulation mode or the second demodulation mode indicates the first demodulation mode and transmitting the one or more downlink signals comprises: transmitting, to the plurality of antenna ports, a single downlink signal via a single downlink beam based at least in part on the first demodulation mode.

Example 37: The method of example 36, wherein precoding the one or more downlink signals comprises: precoding the single downlink signal with a single precoder corresponding to the single downlink beam.

Example 38: The method of any of examples 24 through 35, wherein the indication of at least one of the first demodulation mode or the second demodulation mode indicates the second demodulation mode and transmitting the one or more downlink signals comprises: transmitting, to a first subset of antenna ports of the plurality of antenna ports, a first downlink signal via a first downlink beam; and transmitting, to a second subset of antenna ports of the plurality of antenna ports different from the first subset of antenna ports, a second downlink signal via a second downlink beam different from the first downlink beam, wherein the first downlink signal and the second downlink signal are transmitted based at least in part on the second demodulation mode.

Example 39: The method of example 38, wherein precoding the one or more downlink signals comprises: precoding the first downlink signal with a first precoder corresponding to the first downlink beam; and precoding the second downlink signal with a second precoder different from the first precoder and corresponding to the second downlink beam.

Example 40: The method of any of examples 24 through 39, wherein the indication of at least one of the first demodulation mode or the second demodulation mode comprises a bit field in the UE capability message indicating at least one of the first demodulation mode, the second demodulation mode, or a flexible switching mode between the first demodulation mode and the second demodulation mode.

Example 41: The method of any of examples 24 through 40, wherein the UE capability message comprises an indication of a preferred precoder type, the indication of the preferred precoder type comprising the indication of at least one of the first demodulation mode or the second demodulation mode.

Example 42: The method of any of examples 24 through 41, wherein the first demodulation mode is configured for the UE to demodulate eight or fewer downlink layers and the second demodulation mode is configured for the UE to demodulate four or fewer downlink layers.

Example 43: An apparatus for wireless communications comprising a processor; and memory coupled to the processor, the processor and memory configured to perform a method of any of examples 1 through 23.

Example 44: An apparatus for wireless communications comprising a processor; and memory coupled to the processor, the processor and memory configured to perform a method of any of examples 24 through 42.

Example 45: An apparatus comprising at least one means for performing a method of any of examples 1 through 23.

Example 46: An apparatus comprising at least one means for performing a method of any of examples 24 through 42.

Example 47: A non-transitory computer-readable medium storing code for wireless communications, the code comprising instructions executable by a processor to perform a method of any of examples 1 through 23.

Example 48: A non-transitory computer-readable medium storing code for wireless communications, the code comprising instructions executable by a processor to perform a method of any of examples 24 through 42.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:

transmitting, to a network entity, a UE capability message comprising an indication of at least one of a first demodulation mode supported by the UE or a second demodulation mode supported by the UE, the first demodulation mode corresponding to a demodulation procedure associated with a plurality of antenna ports at the UE and the second demodulation mode corresponding to a plurality of demodulation procedures, each of the plurality of demodulation procedures associated with a respective subset of the plurality of antenna ports at the UE;

receiving, from the network entity, one or more downlink signals via one or more downlink beams, the one or more downlink beams based at least in part on the indication of at least one of the first demodulation mode or the second demodulation mode; and demodulating the one or more downlink signals according to the first demodulation mode or the second demodulation mode based at least in part on the indication.

2. The method of claim 1, further comprising:
transmitting, to the network entity, a plurality of sounding reference signals based at least in part on the indication of at least one of the first demodulation mode or the second demodulation mode, wherein each sounding reference signal corresponds to a respective antenna port of the plurality of antenna ports.

3. The method of claim 2, wherein the indication of at least one of the first demodulation mode or the second demodulation mode indicates the second demodulation mode and wherein transmitting the plurality of sounding reference signals comprises:
transmitting a first subset of sounding reference signals of the plurality of sounding reference signals to the network entity via a first subset of antenna ports of the plurality of antenna ports based at least in part on the second demodulation mode; and
transmitting a second subset of sounding reference signals of the plurality of sounding reference signals different from the first subset of sounding reference signals to the network entity via a second subset of antenna ports of the plurality of antenna ports different from the first subset of antenna ports based at least in part on the second demodulation mode.

4. The method of claim 3, further comprising:
receiving a configuration message comprising an indication of a sounding reference signal resource set configuration for transmitting the plurality of sounding reference signals.

5. The method of claim 4, wherein:
the sounding reference signal resource set configuration comprises a sounding reference signal resource set; and
the first subset of sounding reference signals and the second subset of sounding reference signals are transmitted in the sounding reference signal resource set based at least in part on the configuration message.

6. The method of claim 5, wherein transmitting the first subset of sounding reference signals and the second subset of sounding reference signals comprises at least one of:
transmitting the first subset of sounding reference signals via a first set of consecutive sounding reference signal resources of the sounding reference signal resource set and transmitting the second subset of sounding reference signals via a second set of consecutive sounding reference signal resources of the sounding reference signal resource set; or
transmitting the first subset of sounding reference signals and the second subset of sounding reference signals via interleaved sounding reference signal resources of the sounding reference signal resource set.

7. The method of claim 4, wherein:
the sounding reference signal resource set configuration comprises a first sounding reference signal resource set and a second sounding reference signal resource set;
the first subset of sounding reference signals is transmitted in the first sounding reference signal resource set; and
the second subset of sounding reference signals is transmitted in the second sounding reference signal resource set.

8. The method of claim 7, wherein the first subset of antenna ports corresponds to a first panel associated with the first sounding reference signal resource set and the second subset of antenna ports corresponds to a second panel different from the first panel and associated with the second sounding reference signal resource set.

9. The method of claim 1, wherein the indication of at least one of the first demodulation mode or the second demodulation mode indicates a flexible switching mode between the first demodulation mode and the second demodulation mode.

10. The method of claim 9, further comprising:
transmitting, to the network entity, a request message comprising at least one of a request to transition from the first demodulation mode to the second demodulation mode or a request to transition from the second demodulation mode to the first demodulation mode, wherein transmitting the request message is based at least in part on the flexible switching mode between the first demodulation mode and the second demodulation mode.

11. The method of claim 10, further comprising:
receiving, from the network entity and in response to the request message, a feedback message comprising at least one of an acknowledgement for the UE to transition from the first demodulation mode to the second demodulation mode or an acknowledgement for the UE to transition from the second demodulation mode to the first demodulation mode.

12. The method of claim 9, further comprising:
receiving, from the network entity, a configuration message comprising at least one of an indication for the UE to transition from the first demodulation mode to the second demodulation mode or an indication for the UE to transition from the second demodulation mode to the first demodulation mode.

13. The method of claim 1, wherein the indication of at least one of the first demodulation mode or the second demodulation mode indicates the first demodulation mode and receiving the one or more downlink signals comprises:
receiving, at the plurality of antenna ports, a single downlink signal via a single downlink beam based at least in part on the first demodulation mode.

14. The method of claim 13, wherein demodulating the one or more downlink signals comprises:
performing the demodulation procedure associated with the plurality of antenna ports on the single downlink signal received at the plurality of antenna ports.

15. The method of claim 13, wherein the single downlink signal is associated with a single precoder at the network entity.

16. The method of claim 1, wherein the indication of at least one of the first demodulation mode or the second demodulation mode indicates the second demodulation mode and receiving the one or more downlink signals comprises:
  receiving, at a first subset of antenna ports of the plurality of antenna ports, a first downlink signal via a first downlink beam; and
  receiving, at a second subset of antenna ports of the plurality of antenna ports different from the first subset of antenna ports, a second downlink signal via a second downlink beam, wherein the first downlink signal and the second downlink signal are received based at least in part on the second demodulation mode.

17. The method of claim 16, wherein demodulating the one or more downlink signals comprises:
  performing a first demodulation procedure of the plurality of demodulation procedures on the first downlink signal received at the first subset of antenna ports; and
  performing a second demodulation procedure of the plurality of demodulation procedures on the second downlink signal received at the second subset of antenna ports.

18. The method of claim 17, wherein demodulating the one or more downlink signals further comprises:
  combining a first output of the first demodulation procedure and a second output of the second demodulation procedure.

19. The method of claim 18, wherein combining the first output of the first demodulation procedure and the second output of the second demodulation procedure comprises:
  combining a first log-likelihood ratio value output from the first demodulation procedure and a second log-likelihood ratio value output from the second demodulation procedure.

20. The method of claim 16, wherein the first downlink signal is associated with a first precoder at the network entity and the second downlink signal is associated with a second precoder at the network entity different from the first precoder.

21. The method of claim 1, wherein the indication of at least one of the first demodulation mode or the second demodulation mode comprises a bit field in the UE capability message indicating at least one of the first demodulation mode, the second demodulation mode, or a flexible switching mode between the first demodulation mode and the second demodulation mode.

22. The method of claim 1, wherein the UE capability message comprises an indication of a preferred precoder type, the indication of the preferred precoder type comprising the indication of at least one of the first demodulation mode or the second demodulation mode.

23. The method of claim 1, wherein the first demodulation mode is configured to demodulate eight or fewer downlink layers and the second demodulation mode is configured to demodulate four or fewer downlink layers.

24. A method for wireless communications at a network entity, comprising:
  receiving, from a user equipment (UE), a UE capability message comprising an indication of at least one of a first demodulation mode supported by the UE or a second demodulation mode supported by the UE, the first demodulation mode corresponding to a demodulation procedure associated with a plurality of antenna ports at the UE and the second demodulation mode corresponding to a plurality of demodulation procedures, each of the plurality of demodulation procedures associated with a respective subset of the plurality of antenna ports at the UE;
  precoding one or more downlink signals based at least in part on the indication of at least one of the first demodulation mode or the second demodulation mode; and
  transmitting the one or more downlink signals to the UE based at least in part on the indication of at least one of the first demodulation mode or the second demodulation mode.

25. The method of claim 24, further comprising:
  receiving, from the UE, a plurality of sounding reference signals based at least in part on the indication of at least one of the first demodulation mode or the second demodulation mode, wherein each sounding reference signal corresponds to a respective antenna port of the plurality of antenna ports at the UE.

26. The method of claim 25, wherein the indication of at least one of the first demodulation mode or the second demodulation mode indicates the second demodulation mode and wherein receiving the plurality of sounding reference signals comprises:
  receiving a first subset of sounding reference signals of the plurality of sounding reference signals from a first subset of antenna ports of the plurality of antenna ports based at least in part on the second demodulation mode; and
  receiving a second subset of sounding reference signals of the plurality of sounding reference signals different from the first subset of sounding reference signals from a second subset of antenna ports of the plurality of antenna ports different from the first subset of antenna ports based at least in part on the second demodulation mode.

27. The method of claim 26, further comprising:
  transmitting a configuration message comprising an indication of a sounding reference signal resource set configuration for the UE to transmit the plurality of sounding reference signals.

28. The method of claim 27, wherein:
  the sounding reference signal resource set configuration comprises a sounding reference signal resource set; and
  the first subset of sounding reference signals and the second subset of sounding reference signals are received in the sounding reference signal resource set based at least in part on the configuration message.

29. An apparatus for wireless communications, comprising:
  a processor;
  memory coupled with the processor; and
  instructions stored in the memory and executable by the processor to cause the apparatus to:
    transmit, to a network entity, a user equipment (UE) capability message comprising an indication of at least one of a first demodulation mode supported by the UE or a second demodulation mode supported by the UE, the first demodulation mode corresponding to a demodulation procedure associated with a plurality of antenna ports at the UE and the second demodulation mode corresponding to a plurality of demodulation procedures, each of the plurality of demodulation procedures associated with a respective subset of the plurality of antenna ports at the UE;
    receive, from the network entity, one or more downlink signals via one or more downlink beams, the one or more downlink beams based at least in part on the indication of at least one of the first demodulation mode or the second demodulation mode; and demodulate the one or more downlink signals according to the first demodulation mode or the second demodulation mode based at least in part on the indication.

30. An apparatus for wireless communications, comprising:
a processor;
memory coupled with the processor; and
instructions stored in the memory and executable by the processor to cause the apparatus to:
receive, from a user equipment (UE), a UE capability message comprising an indication of at least one of a first demodulation mode supported by the UE or a second demodulation mode supported by the UE, the first demodulation mode corresponding to a demodulation procedure associated with a plurality of antenna ports at the UE and the second demodulation mode corresponding to a plurality of demodulation procedures, each of the plurality of demodulation procedures associated with a respective subset of the plurality of antenna ports at the UE;
precode one or more downlink signals based at least in part on the indication of at least one of the first demodulation mode or the second demodulation mode; and
transmit the one or more downlink signals to the UE based at least in part on the indication of at least one of the first demodulation mode or the second demodulation mode.

* * * * *